United States Patent [19]
Ikegame

[11] Patent Number: 6,069,867
[45] Date of Patent: May 30, 2000

[54] APPARATUS FOR SUPPORTING OPTICAL SYSTEM OF OPTICAL INFORMATION RECORDING/REPRODUCING APPARATUS AND METHOD OF MANUFACTURING THE SAME

[75] Inventor: Tetsuo Ikegame, Hachioji, Japan

[73] Assignee: Olympus Optical Company, Ltd., Tokyo, Japan

[21] Appl. No.: 08/959,714

[22] Filed: Oct. 28, 1997

Related U.S. Application Data

[63] Continuation of application No. 08/487,553, Jun. 7, 1995, abandoned.

[30] Foreign Application Priority Data

| Jun. 9, 1994 | [JP] | Japan | 6-127680 |
| Jun. 13, 1994 | [JP] | Japan | 6-130433 |
| Jun. 14, 1994 | [JP] | Japan | 6-131980 |

[51] Int. Cl.$^7$ ........................................ G11B 7/09
[52] U.S. Cl. .................. 369/248; 369/44.16; 359/824
[58] Field of Search ............................. 369/247, 248, 369/44.14, 44.15, 44.16, 44.21, 44.72, 244; 359/814, 823, 824

[56] References Cited

U.S. PATENT DOCUMENTS

| 4,948,230 | 8/1990 | Kasahara et al. | 369/44.11 |
| 5,046,821 | 9/1991 | Seino | 359/813 |
| 5,323,369 | 6/1994 | Kim | 369/44.15 |
| 5,467,328 | 11/1995 | Murakami et al. | 359/814 |
| 5,579,176 | 11/1996 | Ikegame et al. | 369/44.15 |

FOREIGN PATENT DOCUMENTS

| 56-94311A | 7/1981 | Japan . |
| 58-182142 | 10/1983 | Japan . |
| 59-124042 | 7/1984 | Japan . |
| 60-29945 | 2/1985 | Japan . |
| 61-258346 | 11/1986 | Japan . |
| 62-36741 | 2/1987 | Japan | 369/44.15 |
| 62-202340 | 9/1987 | Japan . |
| 63-311634 | 12/1988 | Japan | 369/44.16 |
| 2134733 | 5/1990 | Japan . |
| 2232824A | 9/1990 | Japan . |
| 3-73426A | 3/1991 | Japan . |
| 3-147530A | 6/1991 | Japan . |
| 4325932 | 11/1992 | Japan . |
| 546999A | 2/1993 | Japan . |
| 5166208 | 7/1993 | Japan . |
| 5325219A | 12/1993 | Japan . |
| 676331A | 3/1994 | Japan . |
| 6-314432 | 11/1994 | Japan . |

OTHER PUBLICATIONS

Japan Abstracts, JP 59–124043 (A), Ikegame, Jul. 18, 1984.

*Primary Examiner*—David L. Ometz
*Attorney, Agent, or Firm*—Stevens, Davis, Miller & Mosher, L.L.P.

[57] ABSTRACT

An apparatus for supporting an optical system such as an objective lens in an optical recording and/or reproducing apparatus movably in a focusing direction and/or tracking direction including an optical system holding member, a stationary member which is provided on a carriage moving in a radial direction of an optical record disk, leaf springs having one ends connected to the optical system holding member and the other ends secured to the stationary member and being arranged in parallel with each other such that the holding member can be moved in a given direction with respect to the optical record disk, and a damping member arranged between the leaf springs for providing a damping function. The damping member is formed by injecting a fluidizable damping material into a space formed between the leaf springs and retaining the thus injected fluidizable damping material therein by a surface tension. The injected damping material may be cured to form the damping member, if necessary.

14 Claims, 36 Drawing Sheets

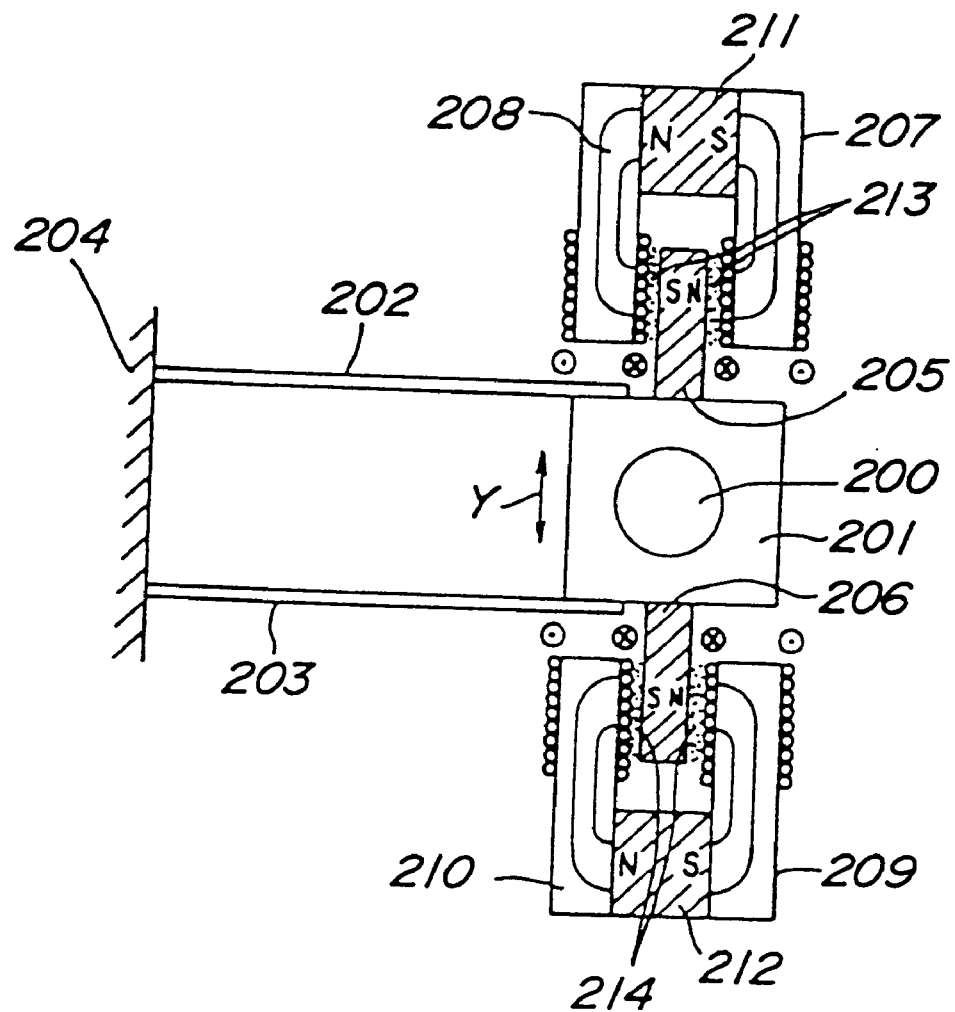
FIG_1
PRIOR ART

FIG_2A
PRIOR ART
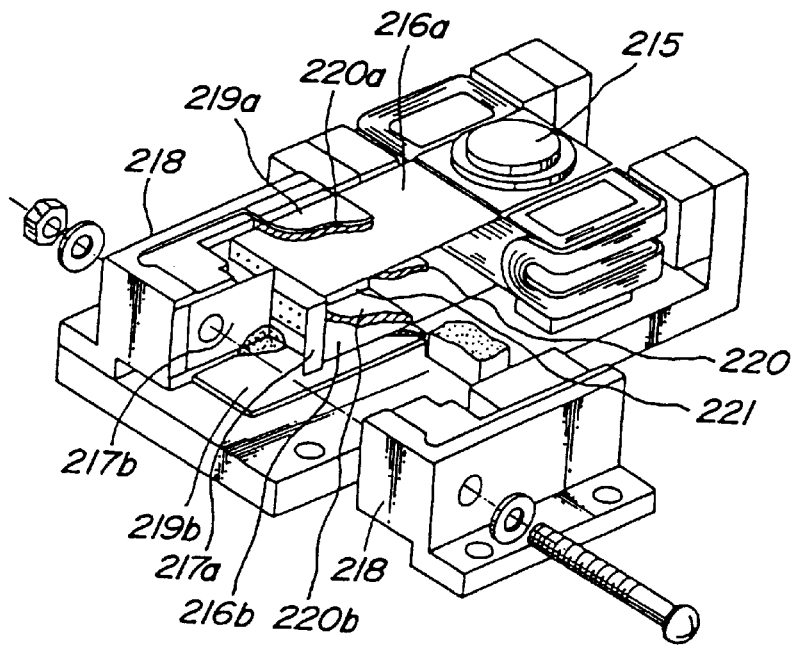
FIG_2B
PRIOR ART
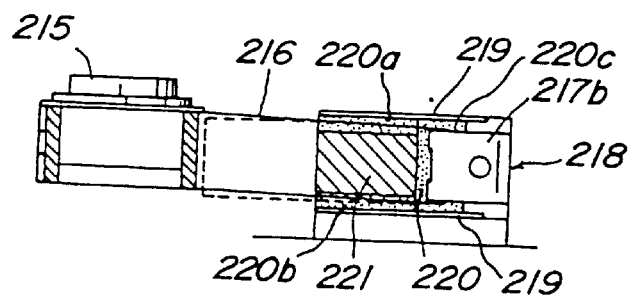
FIG_2C
PRIOR ART
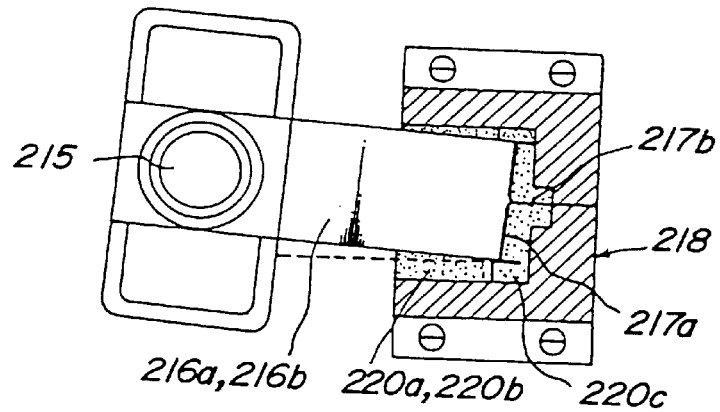

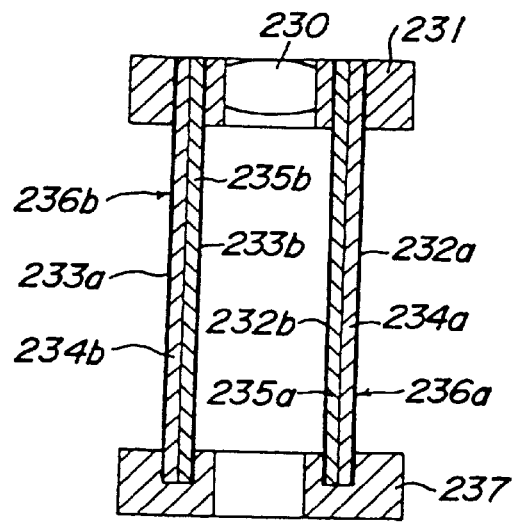
FIG_3
PRIOR ART
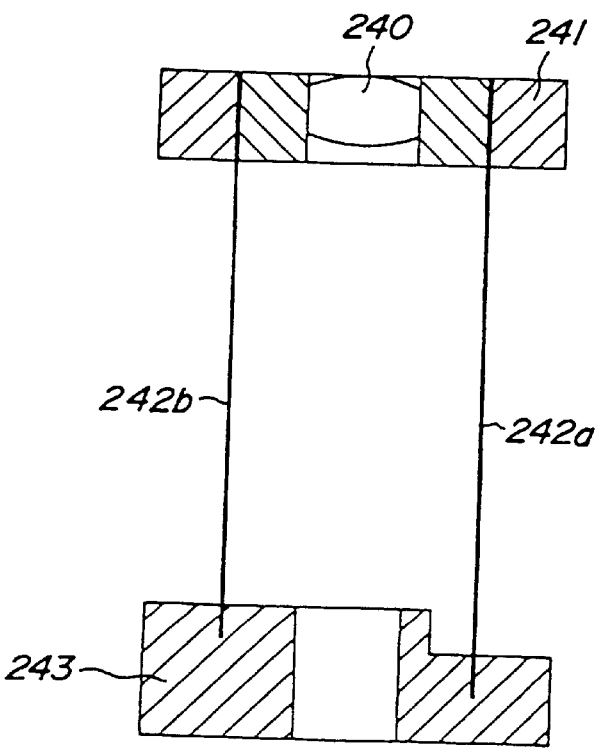
FIG_4
PRIOR ART

FIG_5
PRIOR ART
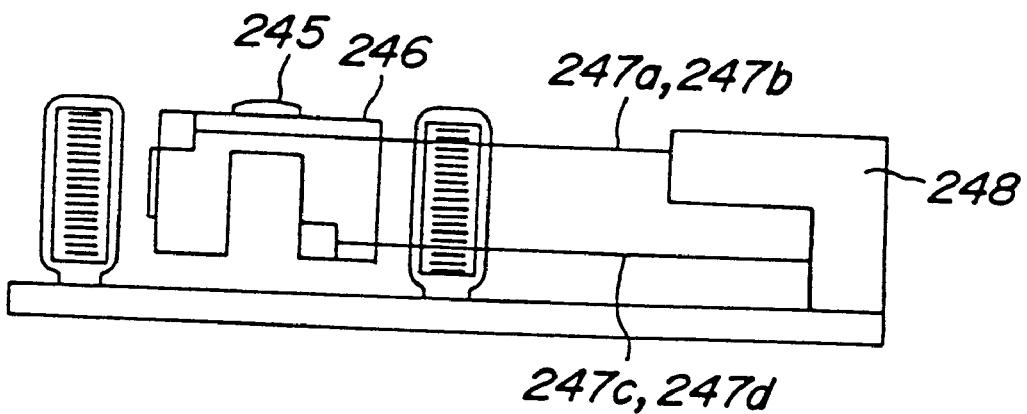

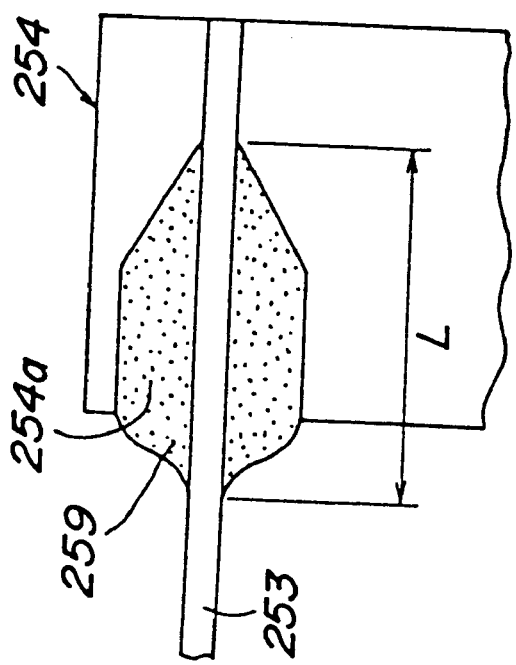
FIG._7A
PRIOR ART
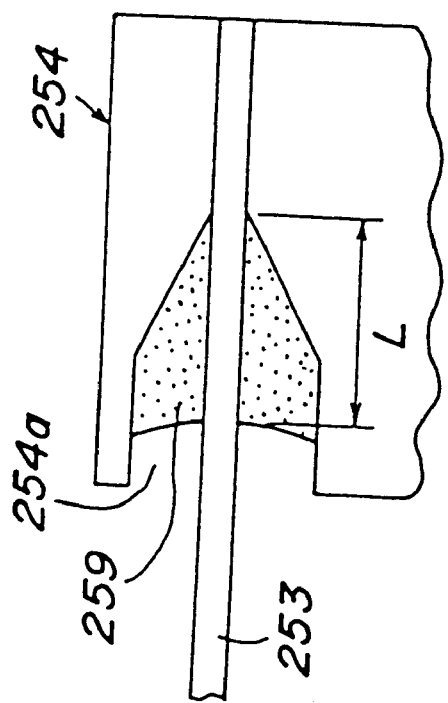
FIG._7B
PRIOR ART

FIG_10
PRIOR ART
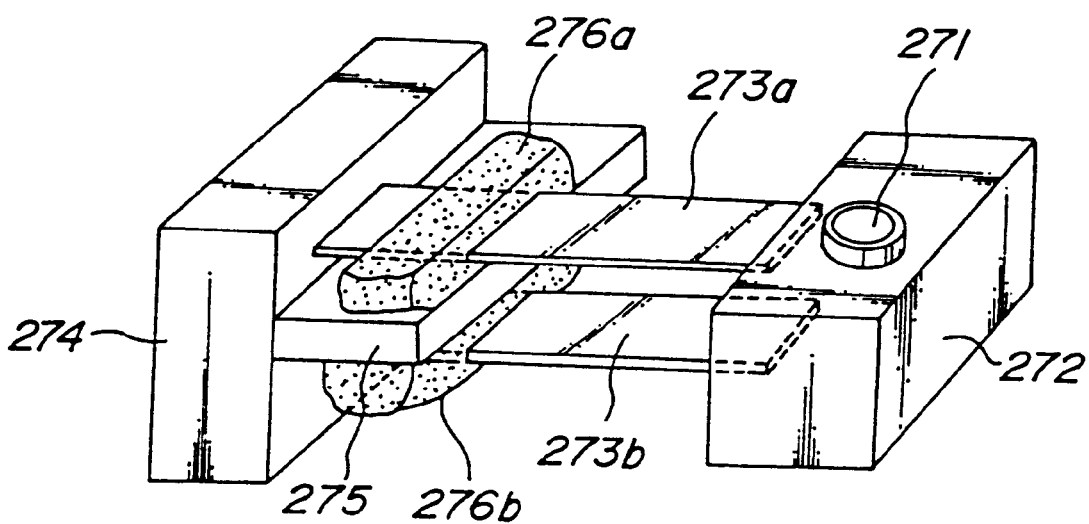

FIG_11
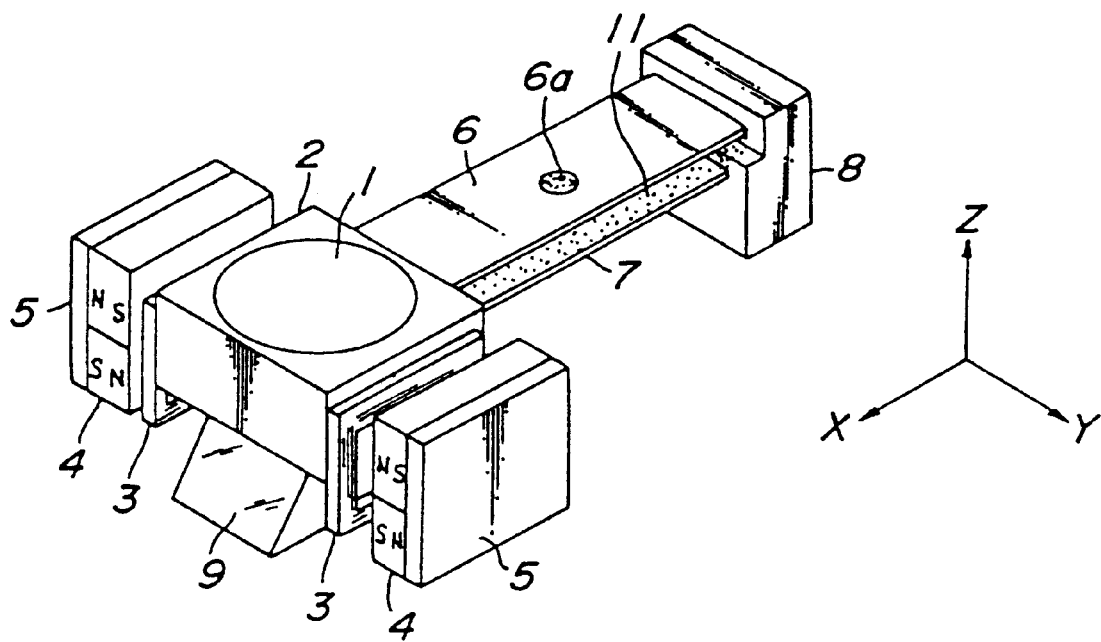
FIG_12
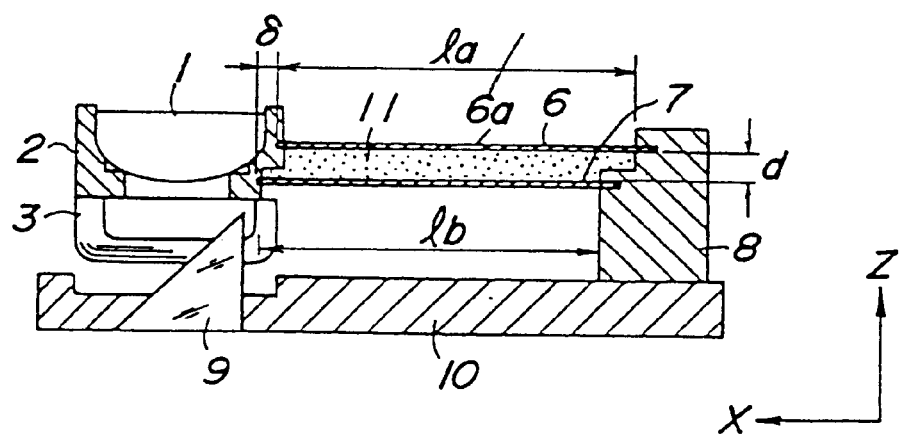

FIG_13A
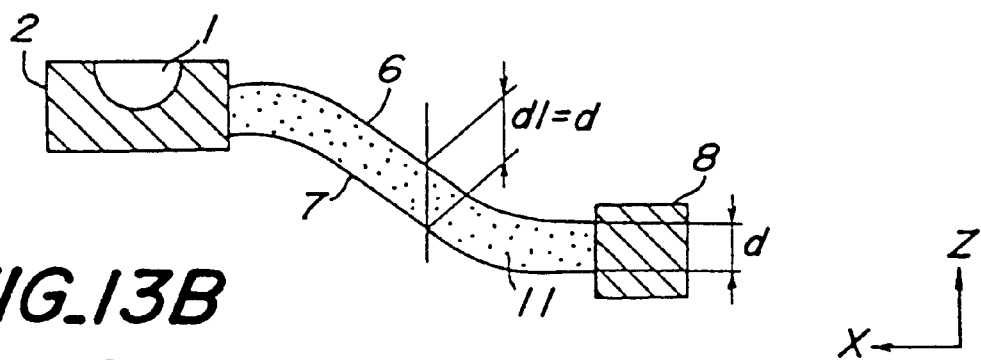
FIG_13B
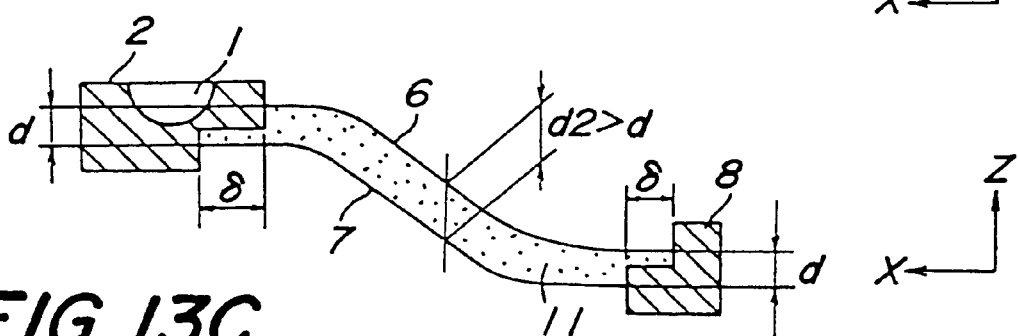
FIG_13C
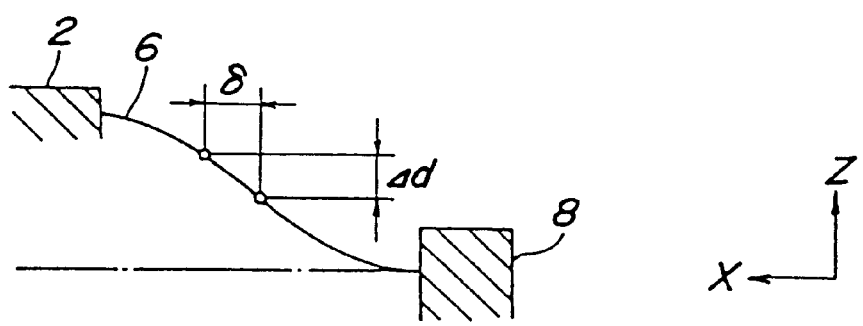
FIG_13D
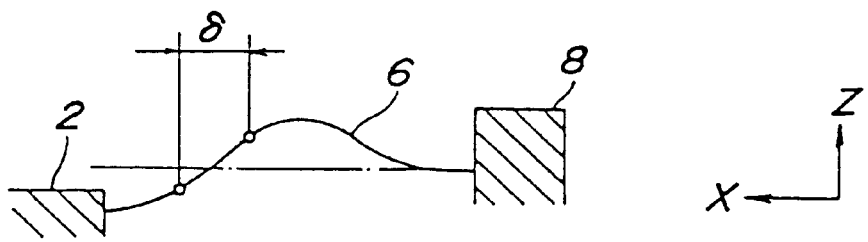

FIG._14
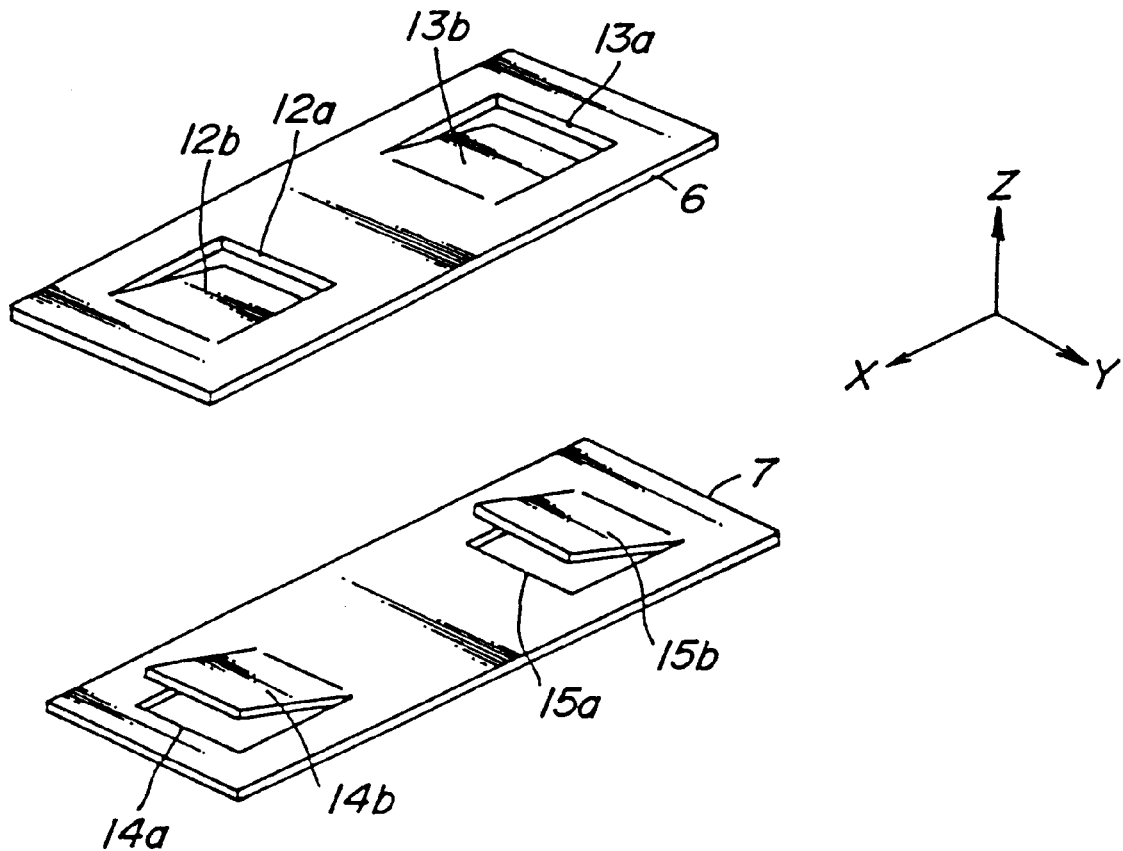
FIG._15
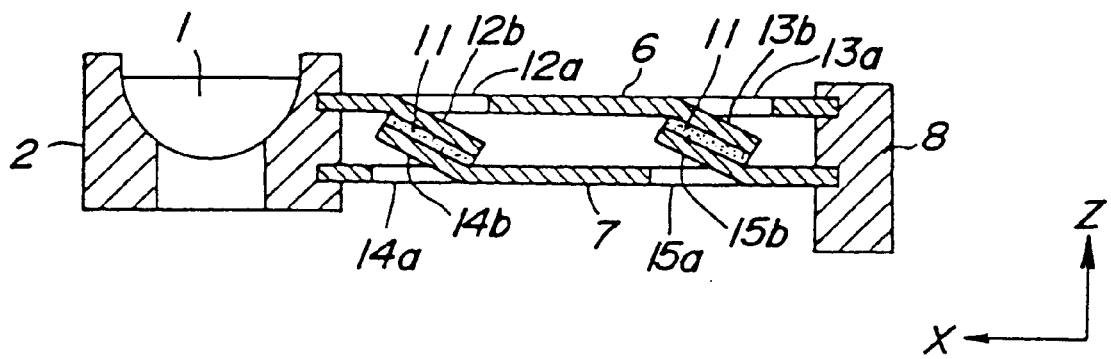

FIG_19
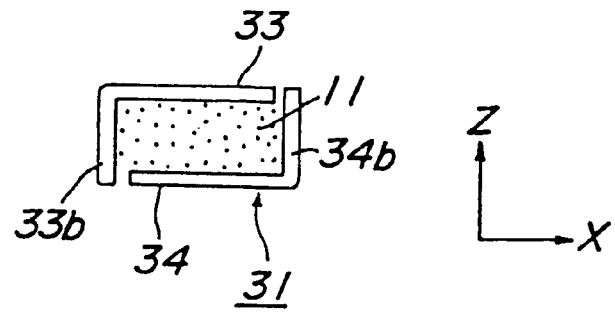
FIG_20A  FIG_20B
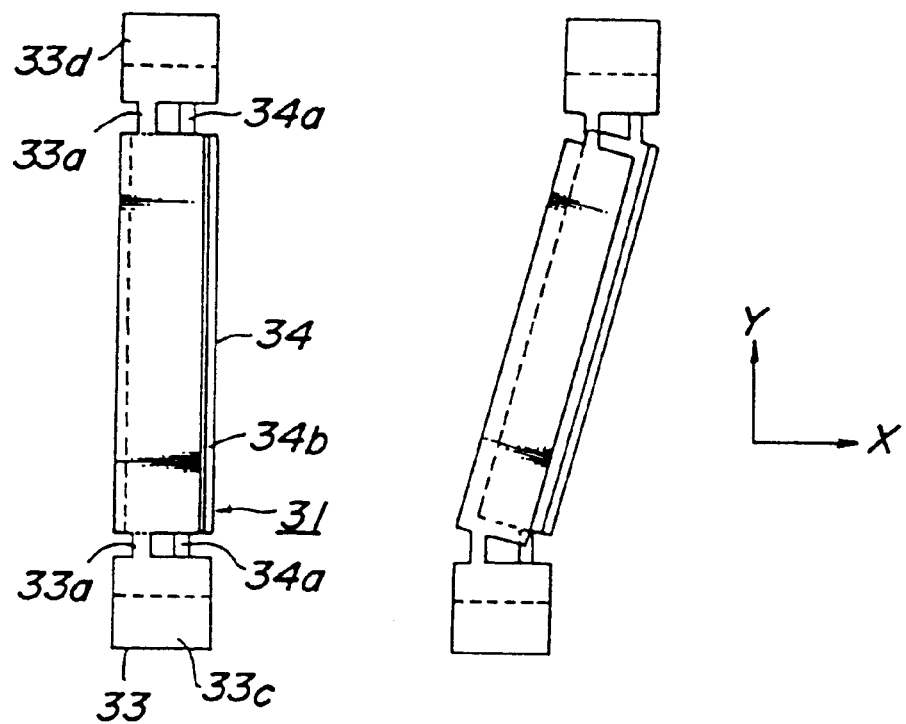

FIG_21
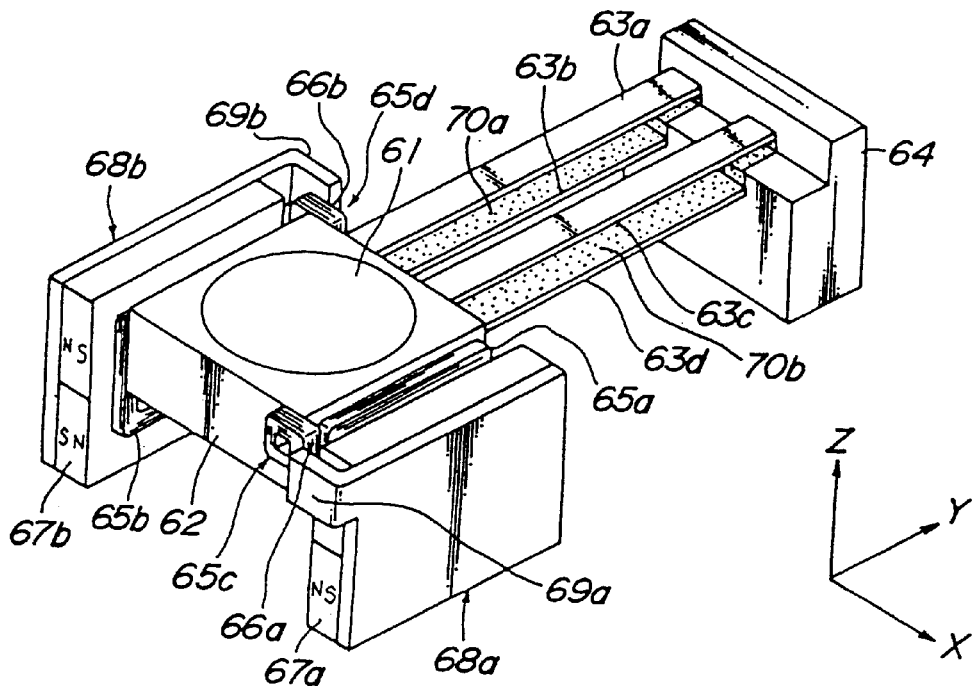
FIG_22
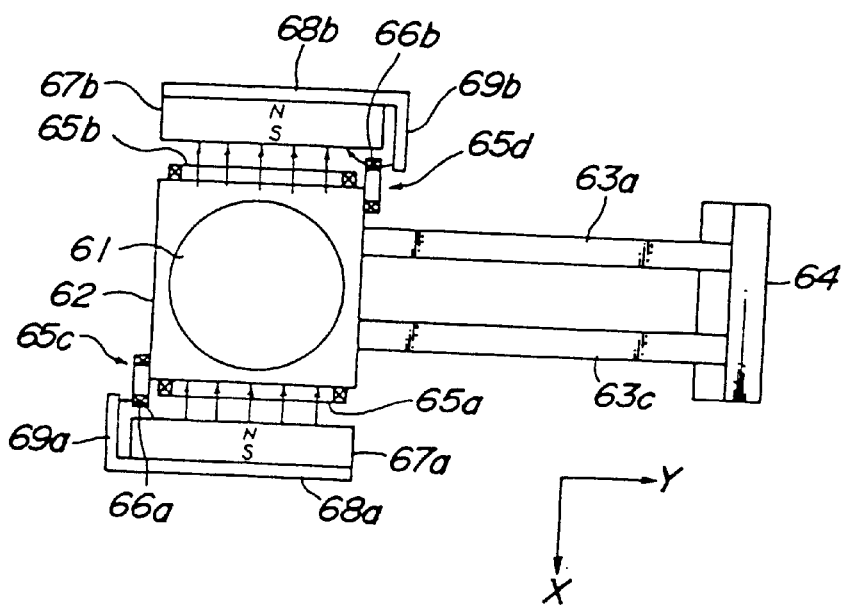

FIG_25
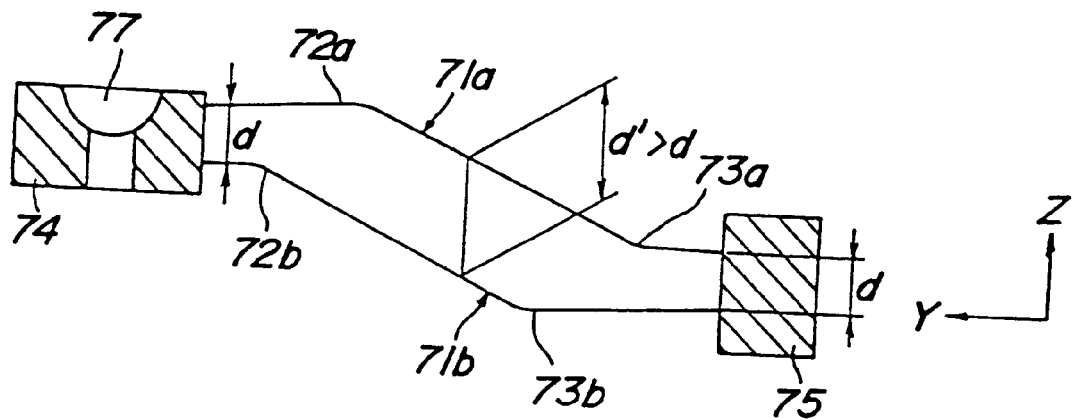
FIG_26
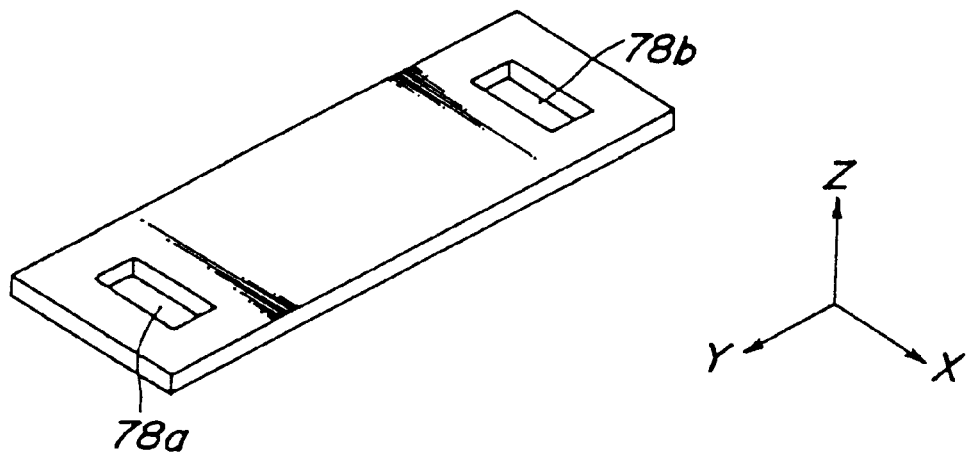

FIG_27
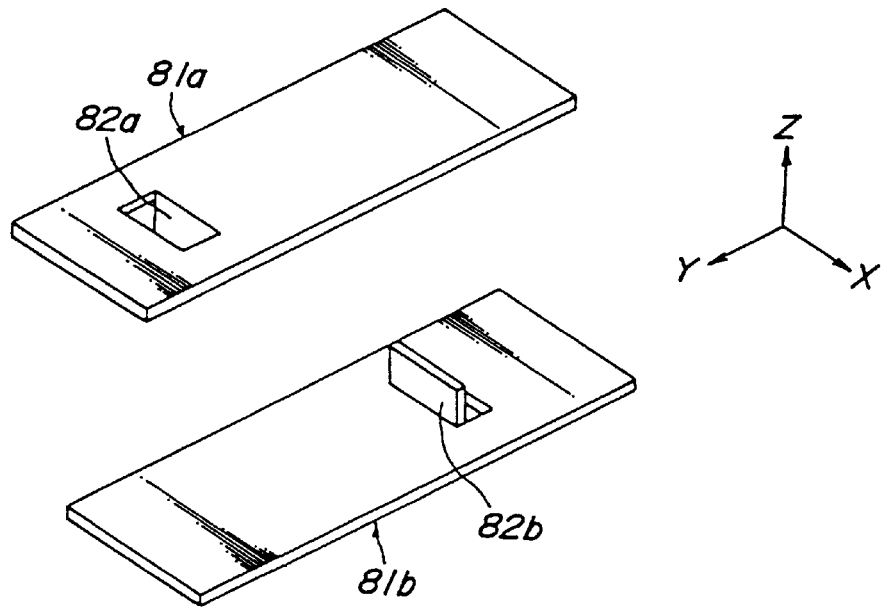
FIG_28
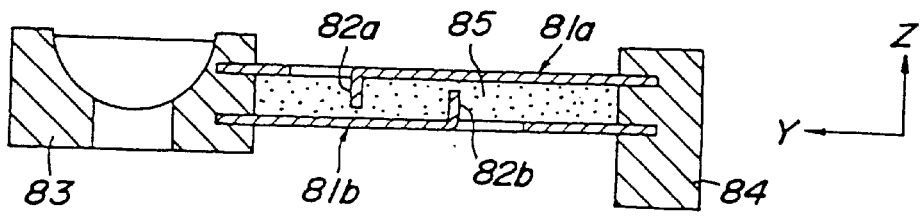
FIG_29
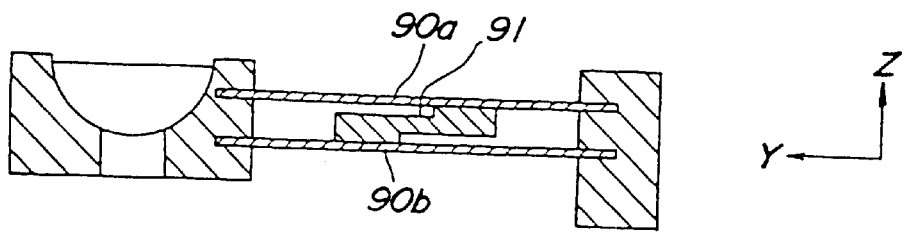

FIG_31

FIG_32

FIG_36
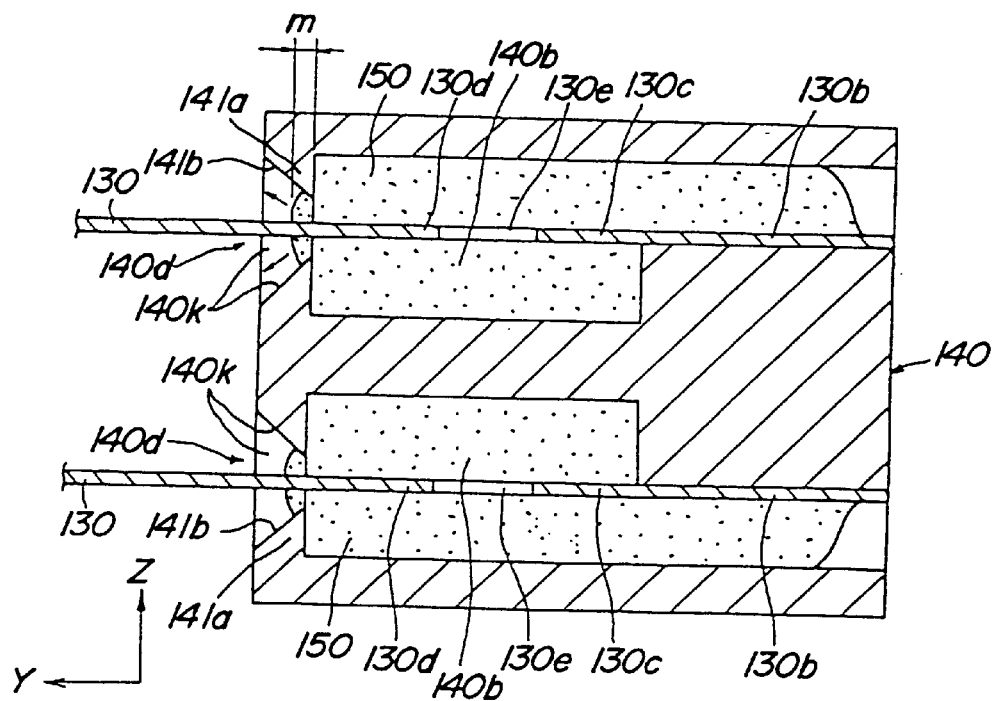
FIG_37
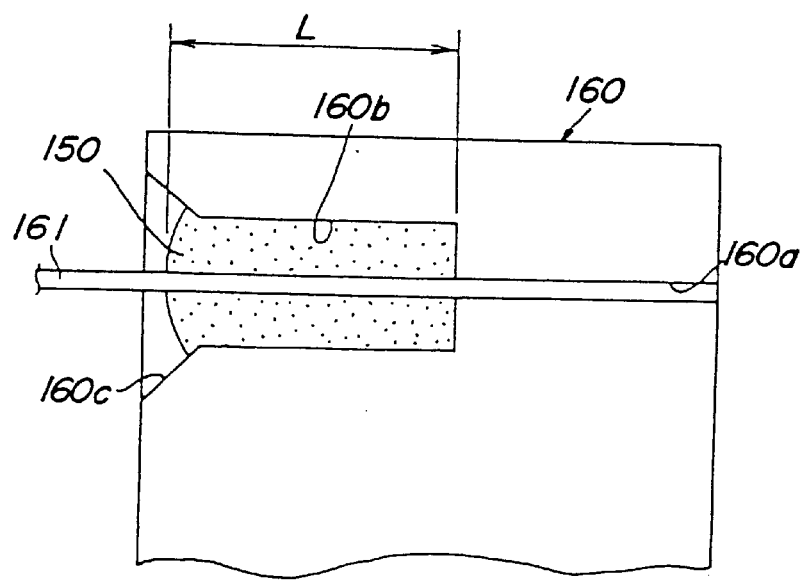

FIG_38
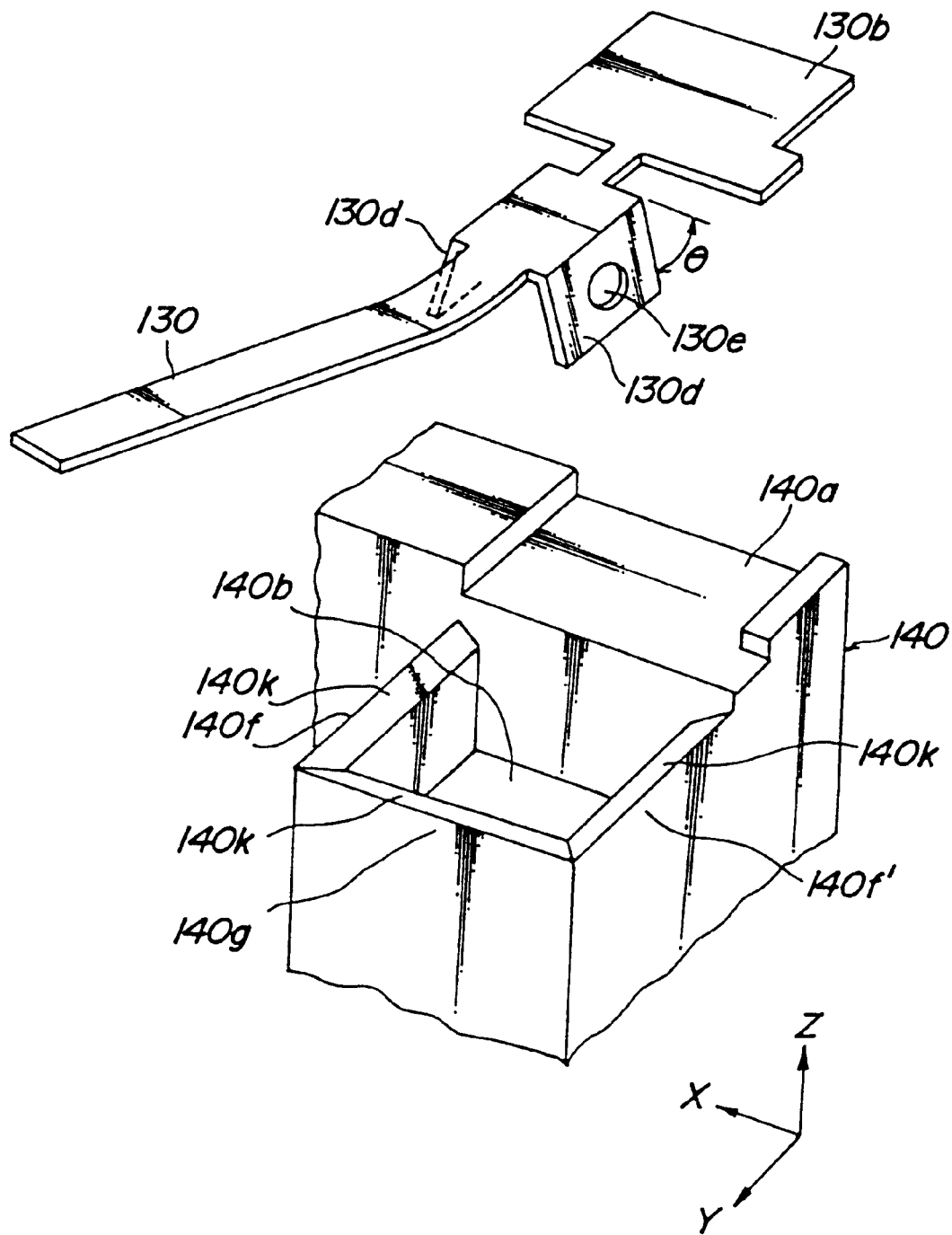

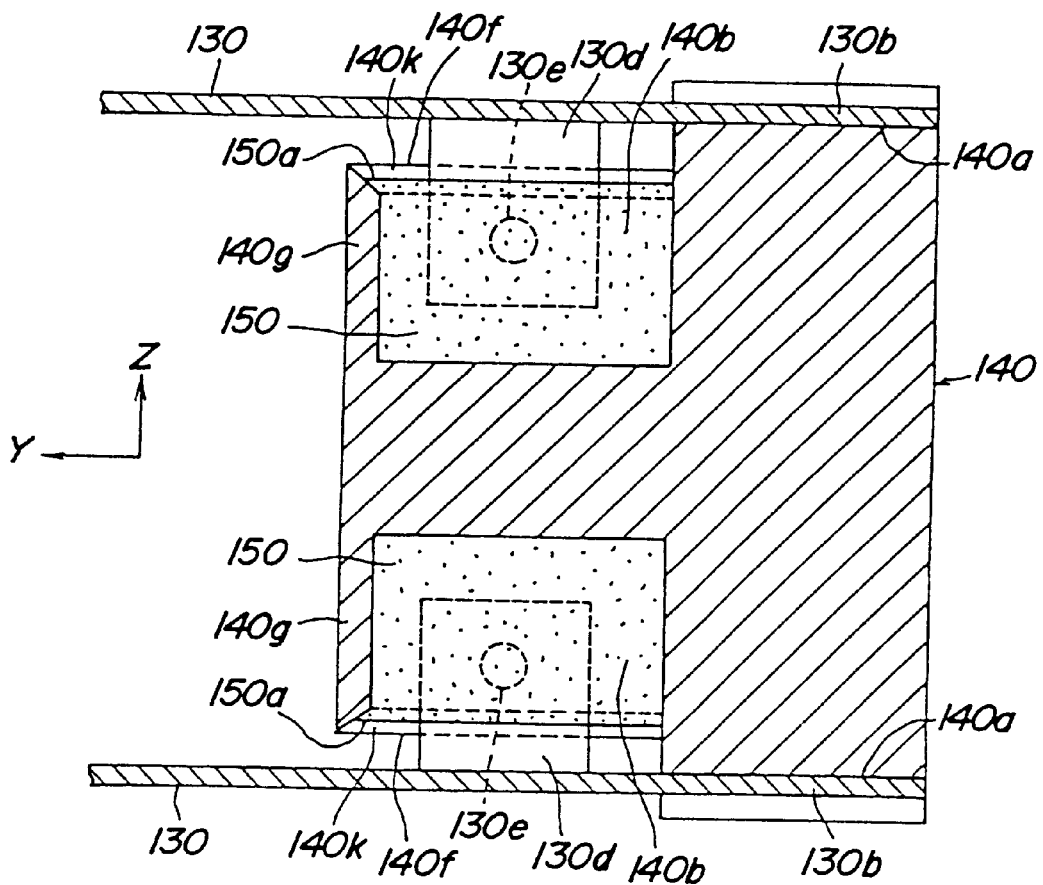
FIG_39

FIG_45
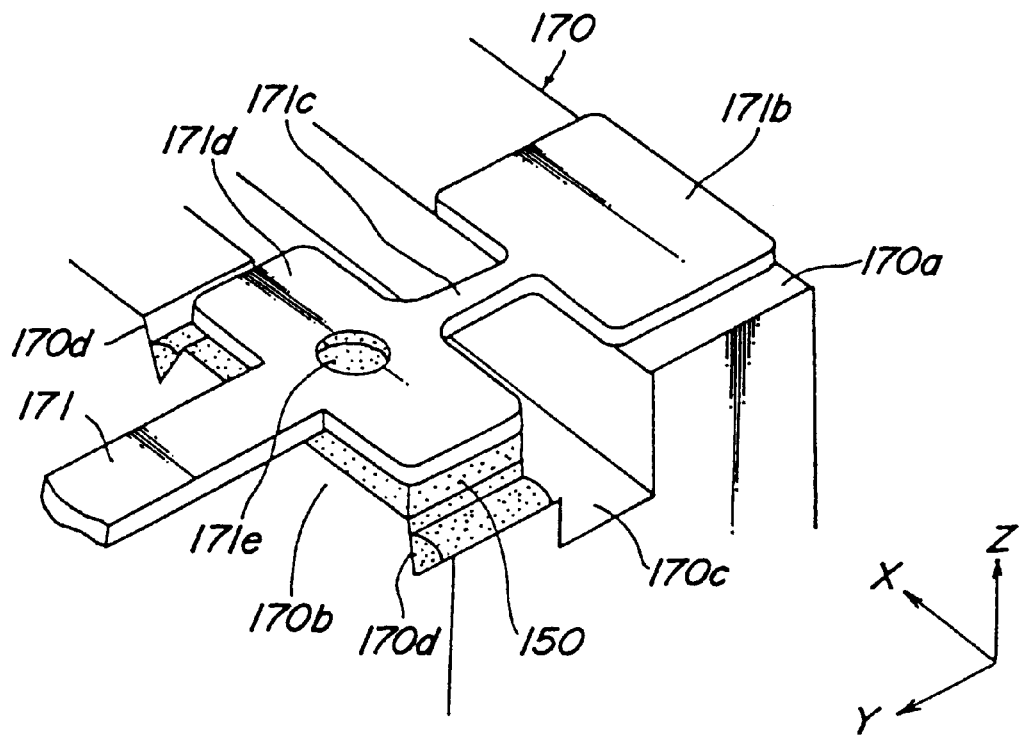
FIG_46
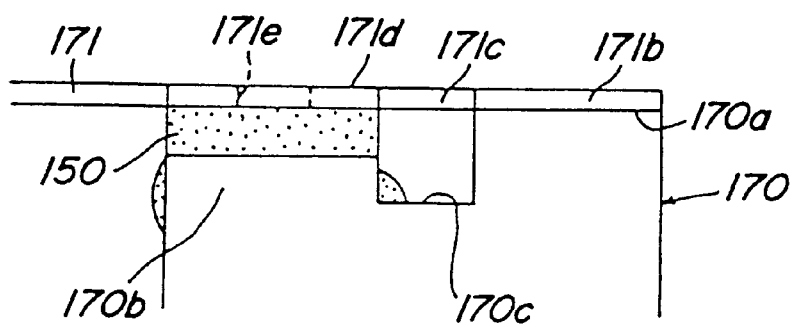

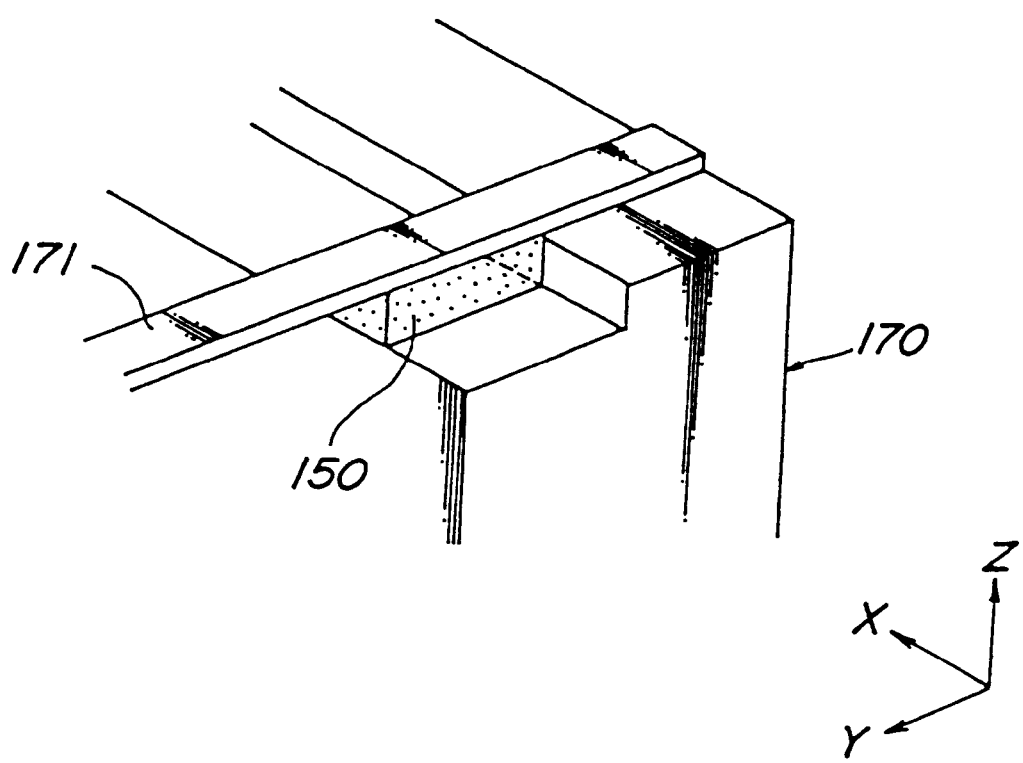
FIG_49

FIG_50
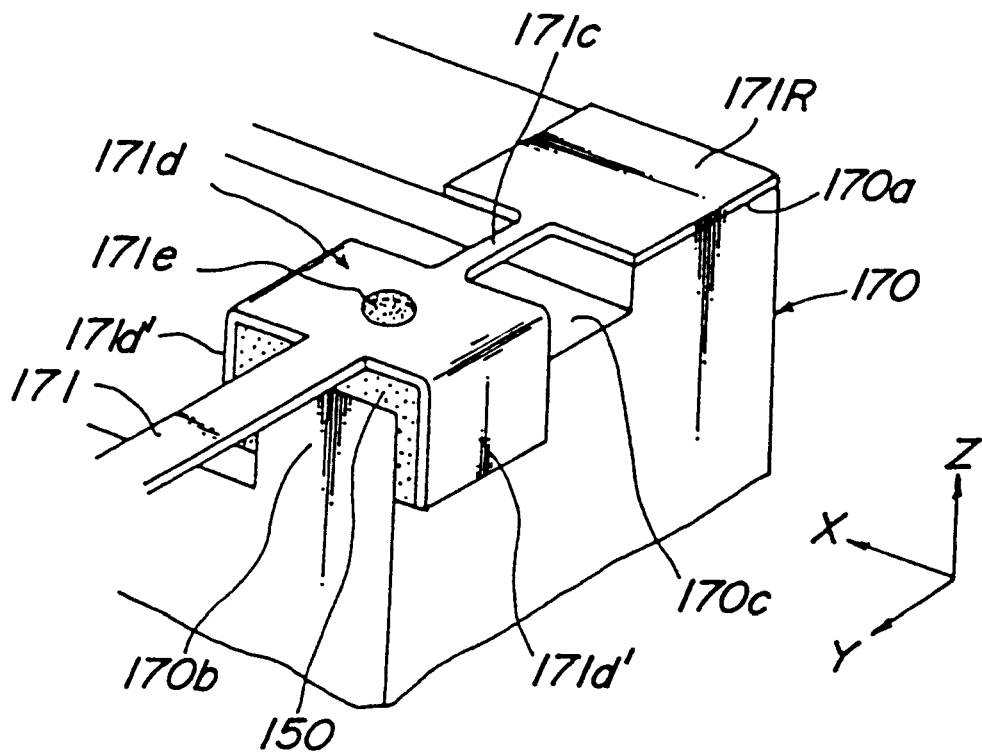
FIG_51
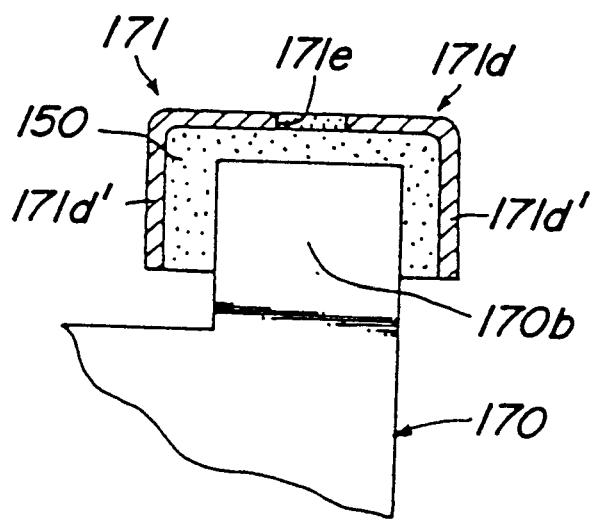

FIG_52
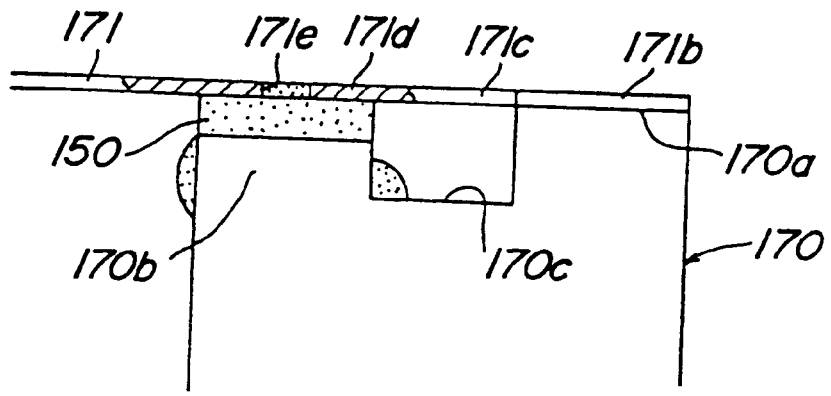
FIG_53
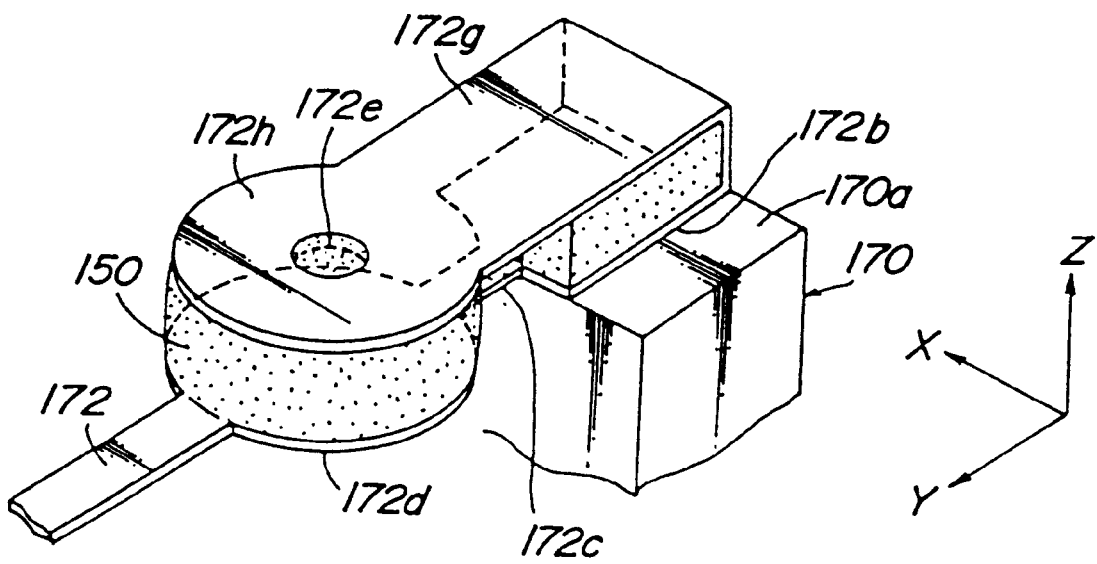

FIG_54
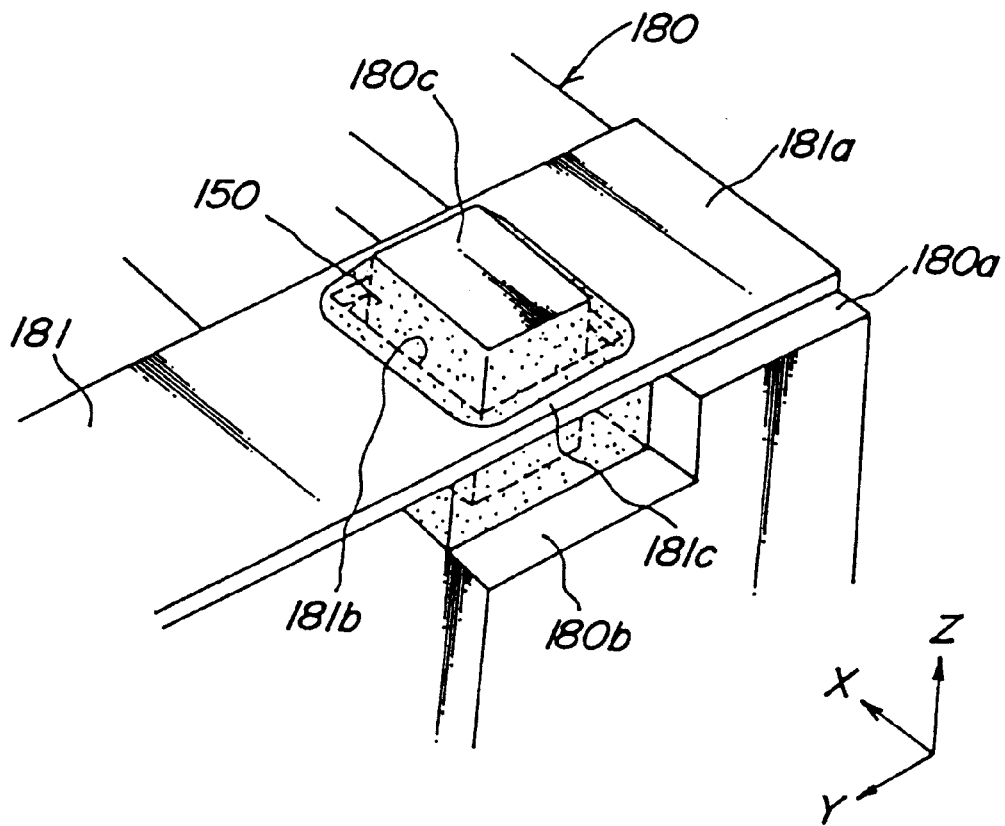
FIG_55
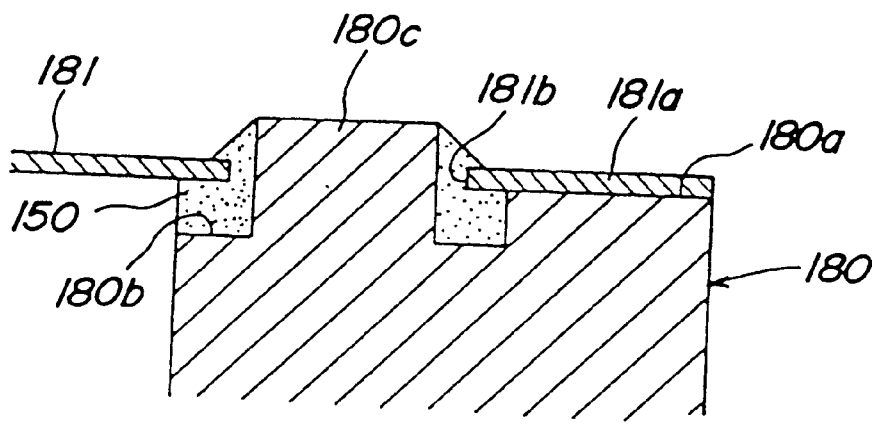

APPARATUS FOR SUPPORTING OPTICAL SYSTEM OF OPTICAL INFORMATION RECORDING/REPRODUCING APPARATUS AND METHOD OF MANUFACTURING THE SAME

This application is a continuation of application Ser. No. 08/487,553, filed Jun. 7, 1997 (abandoned).

BACKGROUND OF THE INVENTION

1. Field of the Invention

The present invention relates to an apparatus for supporting an optical system including an objective lens for projecting a light spot onto an optical information record medium in an optical information recording and/or reproducing apparatus. The present invention also relates to a method of proving a damping member in the apparatus for supporting the optical system.

2. Related Art Statements

In an optical information recording and/or reproducing apparatus, a light beam is projected onto an optical information record medium by means of an optical system having an objective lens opposing to the optical information record medium. In this case, the objective lens has to be supported movably in a direction parallel to an optical axis of the objective lens as well as in a direction perpendicular to the optical axis of the objective lens. In the specification, the direction parallel with the optical axis of the objective lens is called a focusing direction, because by moving the objective lens in this direction, it is possible to perform a focusing control for focusing the light beam on an information track on the optical record medium. A direction perpendicular to the optical axis of the objective lens as well as to a track direction in which the information track extends is called a tracking direction. By moving the objective lens in the tracking direction, the light spot can be moved in a radial direction of a disk shaped optical information record medium to perform a tracking control. A direction perpendicular to the focusing direction as well as to the tracking direction is termed as a tangential direction. By moving the objective lens in the tangential direction, a so-called time base error can be corrected. By moving the objective lens in the focusing direction as well as in the tracking direction, the light spot can be precisely controlled to follow the information track although the optical information record disk is rotated eccentrically in an inclined plane.

In order to perform the focusing and tracking control, the objective lens is supported movably at least in the focusing direction and tracking direction by means of a plurality of resilient supporting members such as wires and leaf springs and is moved in the focusing direction and tracking direction by energizing an electromagnetic accutuator in accordance with focusing error signal and tracking error signal. In this manner, the objective lens is supported by a two-dimensional driving mechanism, In order to operate the two-dimensional driving mechanism stably, it is necessary to suppress a primary resonance of the supporting members effectively. Further, it is preferable to suppress higher order resonances of the supporting members.

In Japanese Patent Laid-open Publication Kokai Sho 56-94311, there are proposed various objective lens supporting apparatuses, in which damping can be attained. As shown in FIG. 1, an objective lens 200 is held by a holding member 201 which is supported by one ends of two leaf springs 202 and 203, whose other ends are secured to a stationary member 204. To the holding member 201 are secured permanent magnets 205 and 206 at opposite surfaces of the holding member. Magnetic circuits are formed by the permanent magnets 205 and 206 together with yokes 207, 20B, 209 and 210 and permanent magnets 211 and 212. Within gaps between the yokes 207 and 208 and the magnets 205 and 206, there are provided magnetic fluids 213 and 214, respectively.

In case of filling a gap between a movable member and a stationary member with a liquid damping material, it is rather difficult to maintain the liquid damping material within the gap and the damping material is liable to spread particularly when a moving range of the movable member is large. In the known optical system supporting apparatus illustrated in FIG. 1, the magnetic fluid is used as a liquid damping material, so that the damping material can be retained within the gap by a magnetic force. In this case, the damping material is limited to the magnetic fluid and non magnetic damping member having various damping properties could not be used. Moreover a portion which is filled with the magnetic fluid is limited to the magnetic circuit, and an amount of the damping material with which the gap is filled is also limited.

FIGS. 2A, 2B and 2C show another known optical system supporting apparatus described in Japanese Patent Application Laid-open Publication Kokai Sho 61-258346. A holding member holding an objective lens 215 of an optical system is secured to one ends of two focusing leaf springs 216a and 216b whose other ends are secured to a connecting member 217a. The connecting member 217a is coupled with a stationary member 118 by means of a tracking leaf spring 217b. Above a portion of the focusing leaf springs 216a and under a portion of the focusing leaf spring 216b near the connecting member 217a there are arranged cover plates 219a and 219b, respectively, said portions of the leaf springs 216a and 216b and the cover plates 219 are embedded within damping members 220a and 22b, respectively made of a viscous material. As can be clearly shown in FIG. 2C, a portion of the tracking leaf spring 217b near the connecting member 217a is also embedded in a damping member 220c. There is further provided an intermediate member 221 between the focusing leaf springs 216a and 216b. The intermediate member 221 functions to deform the damping members 220a and 220b efficiently so that a damping effect improved.

In this known apparatus, since the focusing leaf springs 216a, 216b are surrounded by the cover members 219a, 219b and intermediate member 221 and spaces formed therebetween are filled with the damping members 220a, 220b, the spread of the damping members can be prevented. However, the number of parts is increased and the apparatus becomes complicated. Also, costs are increased accordingly.

In Japanese Patent Application Laid-open Publication Kokai Sho 58-182142, there is disclosed another known optical system supporting apparatus as shown in FIG. 3. In FIG. 3, an objective lens 230 is held by a lens holding member 231 and this lens holding member 231 is supported by means of two supporting members 236a and 236b movably in the tracking direction with respect to a stationary member 237, The supporting member 236a is formed by a composite leaf spring including a pair of leaf springs 232a and 232b and silicone resin layer 234a and viscous rubber layer 235a sandwiched between the leaf springs 232a and 232b. Similarly the supporting member 263b is also formed by a composite leaf spring consisting of a pair of leaf springs 233a and 233b and silicone resin layer 234b and viscous rubber layer 235b sandwiched between the leaf springs 233a and 233b. Such a supporting member 236a, 236b is called a constrained type damping member. The damping member of constrained type has a limited function and the primary resonance could not be suppressed effectively. Furthermore, a mutual relationship between these two leaf string members 236a and 236b.

FIG. 4 depicts another known supporting apparatus described in Japanese Patent Application Laid-open Publication Kokai Sho 59-124042. An objective lens 240 is secured to a lens holding member 241 and the lens holding member is supported by a pair of leaf springs 242a and 242b movably in the tracking direction. The leaf springs 242a and 242b are secured to a stationary member 243 which is shaped such that lengths of the leaf springs 242a and 242b are different from each other. In this manner, resonance frequencies of the leaf springs 242a and 242b differ from each other so that a peak of a resonance of a whole supporting apparatus is reduced.

In this known optical system supporting apparatus, there is not provided any means for defining a mutual relation between the two leaf springs 242a and 242b.

In Japanese Patent Application Laid-open Publication Kokai Hei 5-46999, there is described another known apparatus for supporting the optical system as illustrated in FIG. 5. An objective lens 245 is secured to a lens holding member 246 and this lens holding member is supported by four resilient wires 247a, 247b and 247c, 247d movably in the focusing direction as well as in the tracking direction with respect to a stationary member 248. Effective lengths of these wires 247a–247d are the same, but portions of the lens holding member 246 at which one ends of the wires 247a and 247b (not shown in FIG. 5) are shifted with respect portions of the lens holding member at which one ends of the wires 247c and 247d (not shown in FIG. 5) are secured, and similarly portions of the stationary member at which the other ends of the wires 247a and 247b are secured are shifted with respect to portions of the stationary member at which the other ends of the wires 247c and 247d are secured. Also in this known optical system supporting apparatus, a resonance frequency of the wires 247a, 247b is shifted with respect to a resonance frequency of the wires 247c, 247d so that a peak of a resonance of the whole supporting apparatus can be reduced, but there is not provided any means for damping the resonance.

In Japanese Patent Application Laid-open Publication Kokai Hei 2-232824, there is proposed another known optical system supporting apparatus. In this apparatus, as shown in FIGS. 6A and 6B, an objective lens 251 is held in a lens holding member 252 and the lens holding member is supported by four resilient wires 253 movably in the focusing direction as well as in the tracking direction. Substrates 256 are secured to the lens holding member 252 and one ends of the wires 253 are secured to the substrates 256 by solderings 257. A substrate 255 is secured to the stationary member 254 and the other ends of the wires 253 are secured to the substrate by solderings 257, In order to suppress the undesired first order resonance, in the lens holding member 252 there are formed recesses 252a around the wires 253 and these recesses are filled with damping materials 259. Similarly, recesses 254a are formed in the stationary member 254 around the wires 253 and are filled with damping materials 259. The damping members 259 are made of gel-type damping material.

In case of suppressing the undesired resonance of the supporting apparatus by using a fluidizable damping material such as gel- or sol-type damping materials, gelatine-type damping materials, silicone oil damping material, it is necessary to provide a means for holding the damping material in position otherwise the damping material might be spread or flowed. To this end, in the above mentioned known apparatus, the recesses 252a and 254a are formed and the fluidable damping materials 259 are injected into these, recesses as best shown in FIG. 6B. However, in this case, an amount of the damping material injected into the recess fluctuates as illustrated in FIGS. 7A and 7B. In FIG. 7A, an amount of the damping member 259 is too small so that a length L of a portion of the leaf spring 253 embedded in the damping member is shorter than a desired value. In FIG. 7B, an excessive amount of the damping material 259 is injected into the recess 254a and thus a length L of the leaf spring 243 surrounded by the damping material is longer than a desired value. In any case, a resonance frequency of the supporting apparatus is changed and a desired damping property could not be attained.

In Japanese Patent Application Laid-open Publication Kokai Hei 6-76331, there is described another known optical system supporting apparatus. As depicted in FIG. 8, an objective lens 261 is held by a lens holding member 262 and the lens holding member is supported by four leaf springs 263a–263d movably in the focusing direction as well as in the tracking direction with respect to a stationary member 264. Between the leaf springs 263a and 263b is provided a damping member 265a and between the leaf springs 263c and 263d is arranged a damping member 265b. In this known supporting apparatus, the damping members 265a, 265b are provided between a pair of leaf springs 263a, 263c and 263b, 263d, so that a good damping property is obtained.

The above mentioned publication also discloses an optical system supporting apparatus illustrated in FIG. 9. In this apparatus, lugs 266a–266d formed in the leaf springs 253a–253d, respectively, and a damping member 265a is provided between the lugs 266a and 266b and a damping member 265b is arranged between the lugs 266c and 266d.

In these known apparatuses, the damping members 265a and 265b are not made of the above mentioned fluidable damping material, but are constituted by previously formed damping blocks made of a resilient material. In case of using such a previously formed damping member, various portions have to be manufactured to have predetermined dimensions and shapes so that the damping member can be provided in position. Therefore, a cost of manufacturing the supporting apparatus is liable to be increased.

In Japanese Patent Application Laid-open Publication Kokai Hei 5-325219, there is shown another known optical system supporting apparatus. As shown in FIG. 10, a lens holding member 272 holding an objective lens 271 is supported by a pair of leaf springs 273a and 273b movably in the focusing direction as well as in the tracking direction with respect to a stationary member 274. The stationary member 274 includes a projection 275 extending between the leaf springs 273a and 273b, and parts of the leaf springs are embedded in damping members 276a and 276b made of a viscous material.

In this known optical system supporting apparatus, the damping members 276a and 276b made of a viscous damping material are used so that the damping material does not spread although a means for supporting the damping material is not provided. However, an amount of the damping material applied to the leaf spring 273a, 273b is liable to fluctuate so that a desired damping property could not obtained easily. Moreover, this structure-could not be applied to the apparatus using a fluidable damping material.

SUMMARY OF THE INVENTION

The present invention has for its object to provide a novel and useful apparatus for supporting an optical system of an optical information recording/reproducing apparatus, in which a desired damping property can be positively and easily obtained by using a fluidable damping material.

It is another object of the invention to provide an optical system supporting apparatus, in which a damping property can be improved without making the supporting apparatus large in size and complicated in construction.

It is another object of the invention to provide an optical system supporting apparatus, in which a fluctuation in an amount of a damping material can be decreased to obtain a desired damping property without making the supporting apparatus large in size and complicated in construction.

According to the invention, an apparatus for supporting an optical system in an optical information recording and/or reproducing apparatus comprises:

an optical system holding member for holding the optical system such that the optical system is opposed to an optical record medium;

a stationary member provided on a carriage which is movable in a given direction with respect to the optical record medium;

a supporting means for supporting said optical system holding member movably in at least one direction with respect to said stationary member and including at least two supporting members having one ends secured to said optical system holding member and the other ends secured to said stationary member; and a damping member provided between said two supporting members, said damping member has been formed by injecting a fluidizable damping material into a space formed by said two supporting members and has been retained therein by a surface tension.

According to the invention, said injected fluidizable damping material may be cured by heating or irradiation of ultraviolet radiation. Alternatively, the injected fluidizable damping material may be used as the damping member as it is. In this case, some damping materials are cured naturally during use.

In the optical system supporting apparatus according to the invention, the fluidizable damping material injected into the space formed between the two supporting members can be retained therein by a surface tension, so that it is no more necessary to provide a means for supporting the damping member. Therefore, the apparatus can be made small in size and simple in construction.

According to further aspect of the invention, an apparatus for supporting an optical system in an optical information recording and/or reproducing apparatus comprises;

an optical system holding member for holding the optical system such that the optical system is opposed to an optical record medium;

a stationary member provided on a carriage which is movable in a given direction with respect to the optical record medium;

a supporting means including at least two supporting members having one ends connected to said optical system holding member and the other ends connected to said stationary member, said supporting means supporting said optical system holding member movably in at least in one direction with respect to said stationary member; and a damping member arranged between said two supporting members; wherein said two supporting members are formed such that amplitude and/or phase of a vibration at neighboring portions of the supporting members are shifted.

According to further aspect of the invention, an apparatus for supporting an optical system in an optical information recording and/or reproducing apparatus comprises:

an optical system holding member for holding the optical system such that the optical system is opposed to an optical record medium;

a stationary member provided on a carriage which is movable in a given direction with respect to the optical record medium;

a supporting means including at least two supporting members having one ends connected to said optical system holding member and the other ends connected to said stationary member, said supporting means supporting said optical system holding member movably in at least one direction with respect to said stationary member;

filling portions each provided at at least one end portion of each of said two supporting members which end portion is secured to said optical system holding member or stationary member;

damping members each provided in each of said filling portions, each of said damping member having been formed by injecting a fluidizable damping material into said filling portion and having been retained therein by a surface tension; and a limiting means for limiting a fluctuation in an amount of the damping material injected and retained in each of said filling portions.

The present invention also relates to a method of providing a damping member in an optical system supporting apparatus, and has an object to provide a novel and useful method of providing a damping member in the optical system supporting apparatus, in which a given amount of a fluidable damping material can be applied easily without making the supporting apparatus large in size and complicated in construction.

According to further aspect of the invention, an apparatus for supporting an optical system in an optical information recording and/or reproducing apparatus comprises:

an optical system holding member for holding the optical system such that the optical system is opposed to an optical record medium;

a stationary member provided on a carriage which is movable in a given direction with respect to the optical record medium;

a supporting means for supporting said optical system holding member movably in at least one direction with respect to said stationary member and including at least one supporting member having one end secured to said optical system holding member and the other end secured to said stationary member; and a damping member provided to said supporting member, said damping member has been formed by injecting a fluidizable damping material into a space formed by said supporting member and said optical system holding member or said stationary member and has been retained therein by a surface tension.

According the invention, a method of manufacturing an apparatus for supporting an optical system in an apparatus for recording and/or reproducing information on and/or from an optical record medium, said apparatus comprising an optical system holding member for holding the optical system such that the optical system is opposed to an optical record medium, a stationary member provided on a carriage which is movable in a given direction with respect to the optical record medium, a supporting means for supporting said optical system holding member movably in at least one direction with respect to said stationary member and including at least two supporting members having one ends secured to said optical system holding member and the other ends secured to said stationary member, and a damping member provided between said two supporting members, said method comprising the steps of:

injecting a fluidizable damping material into a space formed between said two supporting members of the supporting means and retaining the thus injected fluidizable damping material therein by a surface tension.

In a preferable embodiment of the method according to the invention, after injecting the fluidizable damping material into the space, the damping material is cured. The curing process may be carried out by heating or irradiation of ultraviolet radiation, According to the invention, the injected damping material may be cured naturally. Furthermore, according to the invention, the injected damping material may not be cured.

BRIEF DESCRIPTION OF THE DRAWINGS

FIG. 1 is a schematic plan view showing a known optical system supporting apparatus using a magnetic fluid;

FIGS. 2A, 2B and 2C depict a known supporting apparatus;

FIG. 3 is a cross sectional view illustrating a known supporting apparatus;

FIG. 4 is a cross sectional view showing a known supporting apparatus;

FIG. 5 is a aide view representing a known supporting apparatus;

FIGS. 7A and 7B cross sectional views explaining a variation if a amount of a damping material;

FIG. 10 is a perspective view depicting still another known optical system supporting apparatus;

FIG. 11 is a perspective view showing a first embodiment of the optical system supporting apparatus according to the invention;

FIG. 12 is a cross sectional view of the apparatus illustrated in FIG. 11;

FIGS. 13A to 13D are schematic views explaining the operation of the leaf springs shown in FIG. 11;

FIG. 14 is a perspective view depicting leaf springs of a second embodiment of the optical system supporting apparatus according to the invention;

FIG. 15 is a cross sectional view illustrating the whole apparatus of the second embodiment;

FIG. 19 is a cross sectional view depicting the leaf spring assembly of the fourth embodiment;

FIGS. 20A and 20B are plan views explaining the operation of the leaf spring assembly of the fourth embodiment;

FIG. 21 is a perspective view illustrating a fifth embodiment of the optical system supporting apparatus according to the invention;

FIG. 22 is a plan view of the fifth embodiment;

FIG. 25 a schematic view explaining the operation of the sixth embodiment;

FIG. 26 is a perspective view showing a modification of the leaf spring of the sixth embodiment;

FIG. 27 is a perspective view showing leaf springs of a seventh embodiment of the optical system supporting apparatus according to the invention;

FIG. 28 is a cross sectional view illustrating the whole apparatus of the seventh embodiment;

FIG. 29 is a cross sectional view depicting an eighth embodiment of the optical system supporting apparatus according to the invention;

FIG. 36 is a cross sectional view showing an assembly of the leaf springs and stationary member in the tenth embodiment;

FIG. 37 is a side view depicting a modification of the tenth embodiment;

FIG. 38 is a perspective view showing a leaf spring and a stationary member of an eleventh embodiment of the optical system supporting apparatus according to the invention;

FIG. 39 is a cross sectional view of the apparatus of the eleventh embodiment;

FIG. 45 is a perspective view showing a fifteenth embodiment of the optical system supporting apparatus according to the invention;

FIG. 46 is a side of the fifteenth embodiment;

FIG. 49 is a perspective view illustrating a third modification of the fifteenth embodiment;

FIG. 50 is a perspective view showing a fourth modification of the fifteenth embodiment;

FIG. 51 is a lateral cross sectional view of the fourth modification;

FIG. 52 is a longitudinal cross sectional view of the fourth modification;

FIG. 53 is a perspective view illustrating a fifth modification of the fifteenth embodiment;

FIG. 54 is a perspective view showing a sixteenth embodiment of the optical system supporting apparatus according to the invention; and FIG. 55 is a cross sectional view of the fifteenth embodiment.

DESCRIPTION OF THE PREFERRED EMBODIMENTS

Figure 6A:
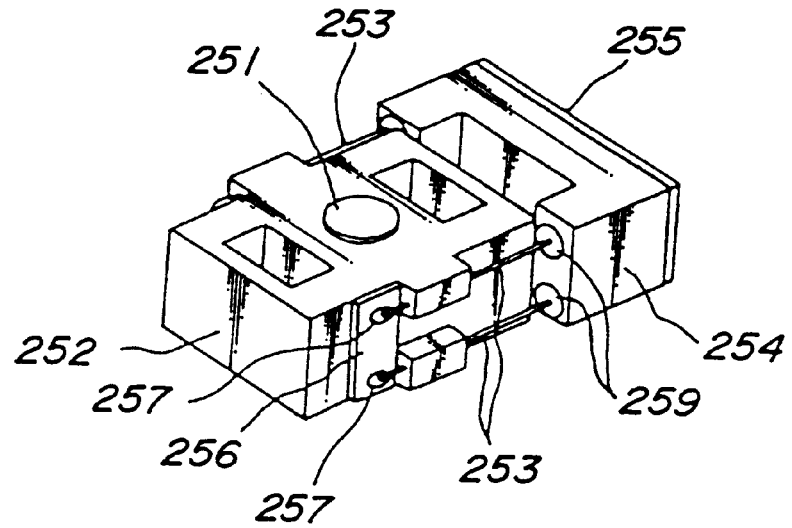
FIGS. 6A and 6B show another known supporting apparatus.

FIGS. 11–13 show a first embodiment of the apparatus for supporting an optical system according to the invention. FIG. 11 is a perspective view illustrating the supporting apparatus, but a carriage for moving the optical system in a radial direction of an optical information record disk is not shown for the sake of simplicity. An objective lens 1 is secured to a lens holding member 2 and focusing coils 3 are secured to opposite side walls of the lens holding member. In opposition to the focusing coils 3, there are arranged permanent magnets 4 to which are secured yokes 5.

The lens holding member 2 is supported by a pair of leaf springs 6 and 7 extending in a radial direction x of an optical record disk in parallel with each other. One of the ends of, the leaf springs 6 and 7 is secured to a side wall of the lens holding member 2 and the other of the ends of the leaf springs is secured to a stationary member 8. As explained above, the stationary member 8 is arranged on a carriage 10 which is moved in a radial direction of an optical record disk, while the stationary member is positioned nearer to a rotational axis of the optical record disk than the holding member 2. In the present embodiment, the leaf springs 6 and 7 are made of a metal such as stainless steel and beryllium copper. By driving the focusing coils 3 in accordance with a focusing error signal, the objective lens 1 can be moved in a focusing direction Z. The lens holding member 2 and stationary member 8 may be formed by molding while both ends of the leaf springs 6 and 7 are inserted into molds. Then, assembly may be simplified.

Below the objective lens 1 is arranged a reflection mirror 9 which reflects a light beam emitted by a light source not shown and propagating in the radial direction X, and the light beam reflected by the mirror 9 is made incident upon the objective lens 1. As explained above, the leaf springs 6 and 7 extend in the radial direction X of the optical record disk. As shown in FIG. 12, the stationary member 8, mirror 9, magnets 4 and yokes 5 are provided on the carriage 10.

As depicted in FIG. 12, the leaf springs 6 and 7 are mutually shifted in the radial direction X. That is, the lower leaf spring 7 is arranged to be closer to an optical axis of the objective lens 1 than the upper leaf spring 6 by a distance δ, δ being 0.5–3 mm, Therefore, the left-hand end portion of the lower leaf spring 7 protrudes slightly under the objective lens 1. Effective lengths $1_a$ and $1_b$ of the leaf springs 6 and 7 are equal to each other and are set to about 10 mm. A distance d between the leaf springs 6 and 7 in the focusing direction Z is about 0.3–2 mm. The distance d should be determined such that a fluidizable damping material can be retained within a space formed between the leaf springs 6 and 7 due to a surface tension.

At a middle of the upper leaf spring 6, there is formed an opening 6a and the fluidizable damping material is injected into the space between the leaf springs 6 and 7 through this opening by means of a dispenser, In the present embodiment, the fluidizable damping material is consisting of UV-curable material. Therefore, after injecting this UV-ourable material into the space, the material is cured by irradiation with ultraviolet radiation to form a damping member 11. In the present embodiment, the damping member 11 is made of the UV-cured silicone resin gel. In this case, after injecting the damping material, the damping material is exposed to ultraviolet light projected from the tracking direction Y. According to the invention, the damping member may be made of various kinds of fluidizable damping materials other than UV-cured silicone resin gel. For instance, thermoset silicone resin gel, UV-cured acrylic resin gel, silicone oils such as silica powder-containing silicone compound and the like, grease and adhesive mainly composed of rubber such as butyl rubber, silicone rubber and the like may be used as a material of the damping member. It should be noted that the damping material 11 may be injected into the space between the leaf springs 6 and 7 from their sides, i.e. from the direction Y. In such a case, it is preferable to use a fluidizable silicone oil. In case of using silicone oils as the fluidizable damping material, it is not necessary to perform the curing process.

Now the function of the damping member 11 will be explained with reference to FIGS. 13A–13D. FIG. 13A shows a comparable example in which the leaf springs 6 and 7 are not mutually shifted in the direction X, FIG. 13B illustrates the present embodiment. In FIG. 13A, when the lens holding member 2 is moved upwardly in the focusing direction Z, the leaf springs 6 and 7 are deformed such that a distance $d_1$ between the leaf springs at any portion thereof is equal to the distance d, because the leaf springs are not mutually shifted in the direction X. Therefore, the damping member 11 interposed between the leaf springs is subjected to a deformation only in the direction X.

In the present embodiment, when the lens holding member 2 is moved in the direction Z, a distance $d_2$ between the leaf springs 6 and 7 at a middle becomes larger than the distance d, because the leaf springs are mounted to be mutually shifted in the direction X. Therefore, the damping member 11 is subjected not only to the slide deformation, but also to a compressing or pulling deformation. Therefore, an amount of the deformation is large so that the damping effect is increased. When the leaf springs 6 and 7 are mounted to be mutually shifted in the direction X, amplitude and/or phase of vibrations of the leaf springs 6 and 7 are shifted in the direction X, so that a deformation of the damping member 11 becomes large and the damping effect is improved.

FIG. 13C illustrates a first order vibration mode of the leaf spring 6 when the objective lens 1 is moved in the focusing direction Z. A difference in an amplitude at positions which are separated from each other by a distance δ amounts to Δd.

This difference Δd corresponds to a difference in amplitude between the leaf springs 6 and 7.

FIG. 13D represents a second order vibration mode of the leaf spring 6. In this case, the leaf spring is subject to a sliding deformation as well as to a compressing deformation, At portions of the leaf spring which are separated from each other by a distance δ, a phase of the vibration is inverted. Therefore, by mutually shifting the leaf springs 6 and 7 in the direction Z, phases of the vibrations of the leaf springs are shifted.

In this manner, in the present embodiment, the amplitude and/or phase of the vibrations of the leaf springs 6 and 7 are shifted in the direction A in which the leaf springs extend, and thus the damping member 11 is subjected to a large deformation and the damping function is improved. It should be noted that only the fundamental first order vibration mode in the Z direction is explained with reference to FIG. 13D, but as to higher order vibration modes in the Z direction and a vibration mode in the X direction, amplitude and/or phase of a vibration in the direction in which two adjacent portions of the leaf springs 6 and 7 are shifted, and thus the damping member 11 is deformed largely and the damping function is improved.

As explained above, in the present embodiment, the damping member 11 is interposed between the two leaf springs 6 and 7 which are deformed in a substantially identical manner, so that even if the objective lens 1 is displaced largely, a relative deformation of the leaf springs remains small and the damping member 11 can be effectively prevented from being pushed out of the space formed between the leaf springs. Furthermore, the damping member 11 is brought into contact with substantially the whole surfaces of the leaf springs 6 and 7, and the damping effect of the leaf springs itself is large.

According to the invention, upon forming the damping member 11, the fluidizable damping material is injected into the space formed between the leaf springs and is retained therein by a surface tension, and therefore it is no longer necessary to provide any means for retaining the injected damping material in position, and therefore the structure of the apparatus becomes simple and small. Further, two leaf springs 6 and 7 have the same configuration and size, so that the manufacturing cost can be further decreased.

When the two leaf springs are arranged close to each other, it would be difficult to insert a previously formed damping member in a space between the leaf springs. However, in the present invention, this does not cause any problem, because the fluidizable damping material can be easily injected into the space between the leaf springs with the aid of a suitable dispenser. Since the damping material is stably retained between the leaf springs, it is advantageous to arrange the leaf springs closer to each other. Further, in the present embodiment, since there is formed the opening 6a in the upper leaf spring 6, the fluidizable damping material can be easily injected through the opening.

upon comparing the supporting apparatus according to the invention with the known apparatus using the laminated leaf spring shown in FIG. 3, in the present embodiment the number of leaf springs can be reduced, so that the apparatus can be less expensive. Furthermore, in the present embodiment, because the lower leaf spring 7 protrudes under the objective lens 1, a size in the direction x is not increased although the leaf springs are relatively shifted in the direction X.

FIGS. 14 and 15 show a second embodiment of the optical system supporting apparatus according to the invention. In the present embodiment, portions similar to those of the first embodiment are denoted by the same reference numerals used in the first embodiment, In the present embodiment, in an upper leaf spring 6 there are formed cuts 12a and 13a and lug portions 12b and 13b formed by the cuts are pressed in the −Z direction, and similarly in a lower leaf spring 7 there are formed cuts 14a and 15a to form lug portions 14b and 15b and the lug portions are pressed in the +Z direction. When the leaf springs 6 and 7 are arranged in parallel with each other between holding member 2 and stationary member 8 as illustrated in FIG. 15, the lug portions 12b and 14b are faced with each other with a thin space and the lug portions 13b and 15b are faced with each other also with a thin space. Then, damping material made of silicone oil are injected into these spaces to form damping members 11. It should be noted that the lug portions 13b and 15b may be formed by lug pieces which are secured to the leaf springs.

When the leaf springs 6 and 7 are moved in accordance with a displacement of an objective lens 1, the amplitude and/or phase of vibrations of the leaf springs 6 and 7 are shifted, because root positions of the lug portions 12b and 14b and root positions of the lug portions 13b and 15b are mutually shifted in the direction Z. Further, when the objective lens 1 is moved in the direction Z (lateral vibration), a distance between the lug portions 12b and 14b as well as a distance between the lug portions 13b and 15b are changed and the damping members 11 are deformed largely.

Further, when the leaf springs 6 and 7 are vibrated in the direction X (longitudinal vibration), the above mentioned distances between opposing lug portions are changed and the damping materials 11 are also deformed, so that the damping effect is enhanced. The remaining construction of the present embodiment is the same as the first embodiment.

Figure 16:
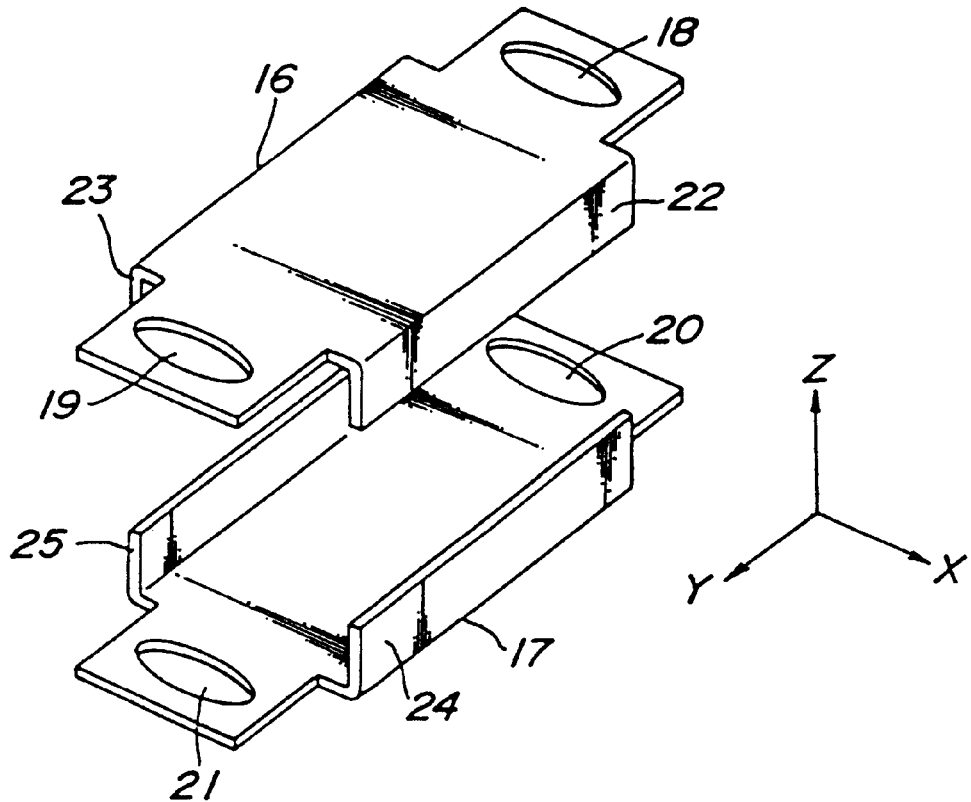
FIG. 16 is a perspective view depicting leaf springs of a third embodiment of the optical system supporting apparatus according to the invention.
Figure 17:
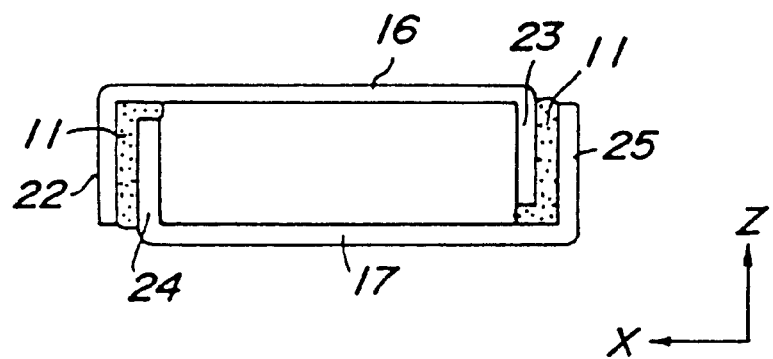
FIG. 17 is a cross sectional view illustrating the leaf spring assembly of the third embodiment.

Also in the present embodiment, a relative deformation of the leaf springs 6 and 7 is not excessively large even if the objective lens 1 is displaced largely, and therefore the silicone oil forming the damping members 11 can be effectively prevented from being spread out of the spaces between the opposing lug portions. Moreover, the distances between the opposing lug portions can be adjusted at will by changing a bending angle of the lug portions. Therefore, an optimum space can be formed simply in accordance with a kind of a damping material to be used without changing a distance between the leaf springs. For instance, when a damping material having a low viscosity is used, the distance may be small. Further when it is desired to apply a large amount of damping material, the distance may be large. In this manner, in the present embodiment, a size of a space in which the damping material is retained can be adjusted without changing a distance between the leaf springs. That is to say, the two leaf springs may be separated from each other by such a distance that the damping material could not be retained therebetween stably. Further, in the present embodiment, an amount of the damping material can be saved, FIGS. 16 and 17 are an exploded perspective view and a front view showing a third embodiment of the optical system supporting apparatus according to the invention. In leaf springs 16 and 17 are formed elliptical openings 18, 19 and 20, 21, respectively at opposite end portions thereof. Portions of sides of the leaf springs 16 and 17 situated between the openings viewed in the direction Y are widened and are bent in the direction Z to form upright side portions 22, 23 and 24, 25.

As illustrated in FIG. 17, these leaf springs 16 and 17 are arranged opposite to each other while they are relatively shifted in the direction Y very slightly. Then, a fluidizable dampling material is injected into a space formed between the upright side portions 22 and 24 as well as into a space formed between the upright side portions 23 and 25 to form damping members 11. In order to retain the fluidizable damping material within the spaces stably, a thickness of the spaces is preferably set to about 0.1–1 mm.

Also in the present embodiment, the damping material constituting the damping members 11 is retained within the spaces formed by the upright side portions 22, 23 and 24, 25 of the leaf springs 16 and 17, and therefore although the objective lens is moved largely, the relative deformation of the leaf springs does not become excessively large and the damping material can be effectively prevented from being pushed out of the spaces.

Further, both ends of the leaf springs 16 and 17 are mechanically weakened by forming the openings 18–21, so that the leaf springs can be easily moved in the direction Z when the optical system is moved in the direction Z. In this case, the positions of the upright side portions 22 and 24 as well as the positions of the upright side portions 23 and 25 are shifted in the direction X, so that the superior damping effect can be attained due to the viscosity resistance of the damping material of the damping members 11. Moreover, in the present embodiment, a mechanical strength of a middle portion of respective leaf springs 16 and 17 is small, and thus higher order lateral vibrations of the leaf springs can be effectively prevented. Further, a thickness of the spaces between the upright side portions can be adjusted at will by relatively moving the leaf springs in the direction x, while a distance between the leaf springs measured in the direction z is not changed. The openings 18–21 formed in the leaf springs 16 and 17 serve to weaken a mechanical strength of the leaf springs also in the direction X. Therefore, the objective lens can be supported movably not only in the direction Z, i.e. focusing direction, but also in the direction X, i.e. tracking direction.

Figure 18:
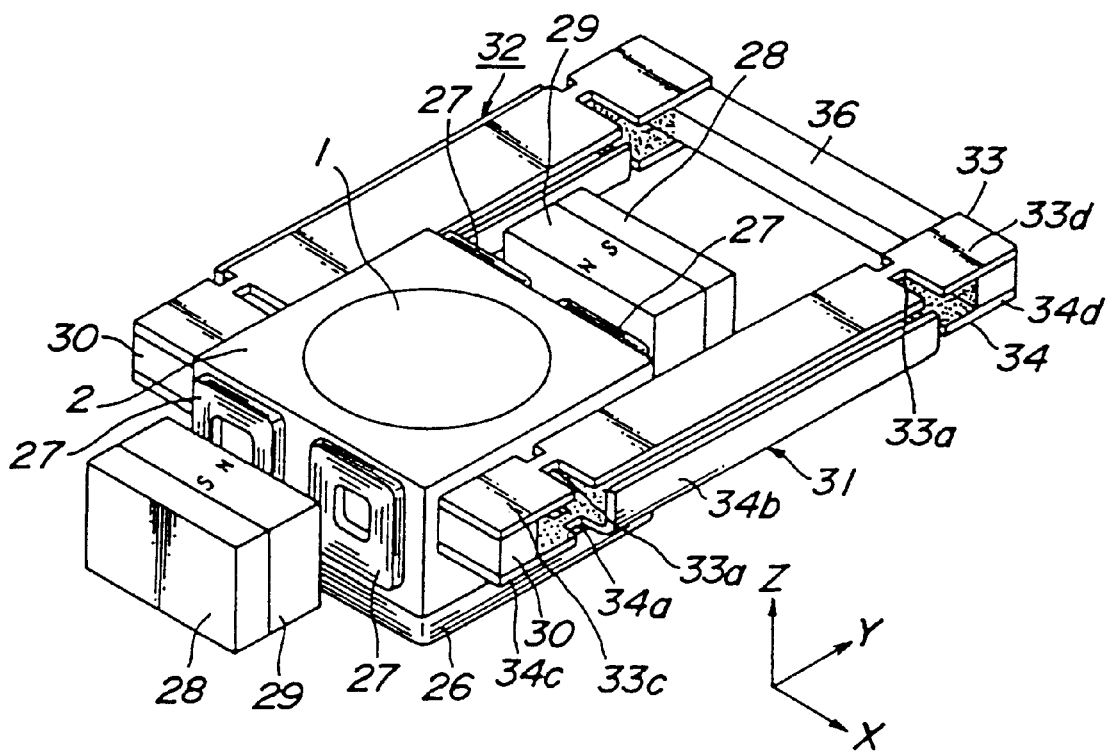
FIG. 18 is a perspective view showing a fourth embodiment of the optical system supporting apparatus according to the invention.

FIGS. 18 to 20 show a fourth embodiment of the optical system supporting apparatus according to the invention. In the present embodiment, an objective lens 1 is supported by springs movably in the direction z, i.e. the focusing direction as well as in the direction X, i.e. the tracking direction. To this end, an objective lens 1 is held by a holding member 2 and a focusing coil 26 is wound on the holding member. Two tracking coils 27 are respectively secured to opposite side walls of the holding member 2 viewed in the direction Y. Permanent magnets 29 are arranged opposite to the tracking coils 27 and yokes 28 are secured to the magnets. On opposite side walls of the objective lens holding member 2 viewed in the direction X, there are formed projections 30 for securing spring mechanisms 31 and 32 as will be explained hereinafter.

The spring mechanism 31 comprises upper and lower leaf springs 33 and 34 having formed therein at both end portions flexure portions 33a and 34a by reducing a width of the leaf springs locally. Between the flexure portions 33a of the upper leaf spring 33 there is formed an upright side portion 33b, and similarly between the flexure portions 34a of the lower leaf spring 34 there is formed an upright side portion 34b. As clearly shown in FIG. 19, ends 33c and 34c of the leaf springs 33 and 34 with the upright side portions 33b and 34b are secured to the projection 30 to form a rectangular space. The other ends 33d and 34d of the leaf springs 33 and 34 are secured to a stationary member 36. The other spring mechanism 32 is formed in a similar manner and is secured to the other projection 30 as well as the stationary member 36. As best shown in FIGS. 20A and 20B, the flexure portion 33a of the leaf spring 33 and the flexure portion 34a of the leaf spring 34 are relatively shifted in the direction X.

Then, a fluidizable damping material is injected into the spaces formed between the upper and lower leaf springs 33 and 34 of the spring mechanisms 31 and 32 to form a damping member 11. As shown in FIG. 18, the damping material is injected into spaces formed by end portions 33c and 34c as well as end portions 33d and 34d. As in previous embodiment, the fluidizable material may be cured into the damping members 11 if necessary.

FIG. 20A illustrates a condition without deformation and FIG. 20B shows a condition in which the springs are deformed in the tracking direction X. As explained above, the flexure portions 33a of the leaf spring 33 and the flexure 34a of the leaf spring 34 are relatively shifted in the direction X and thus when the objective lens is moved in the direction X and the leaf springs 33 and 34 are deformed, a space defined by these leaf springs is also deformed as shown in FIG. 20B. When the objective lens 1 is displaced in the direction Z, the leaf springs 33 and 34 are deformed in a manner substantially similar to FIG. 13A and the space surrounded by the leaf springs is also deformed.

In the present embodiment, although the objective lens 1 is displaced largely, the deformation of the spring mechanisms 31 and 32 is not excessively large and the damping members 11 made of a fluidizable damping material can be stably retained within the space between the leaf springs. Further, when the objective lens 1 is moved in the directions x and Z, the space defined by the leaf springs is deformed, and thus the damping member 11 is subjected to the fluidity resistance and the damping function is effectively performed. In the present embodiment, the leaf springs have the flexure portions formed therein such that they are relatively shifted in the direction X. Therefore, the damping function is further enhanced.

FIGS. 21 and 22 are perspective and plan views, respectively showing a fifth embodiment of the optical system supporting apparatus according to the invention. In the present embodiment, an objective lens 61 is supported movably in the focusing direction Z as well as in the tracking direction X. The objective lens 61 is secured to a holding member 62 and this holding member is supported movably by means of four leaf springs 63a–63d with respect to a stationary member 64. The leaf springs 63a–63d are arranged to extend in the direction Y in parallel with each other.

Focusing coils 65a and 65b are secured to side walls of the holding member 62 which are opposite to each other in the direction X and tracking coils 65c and 65d are secured to side walls of the holding member which are opposite to each other in the direction Y. The tracking coils 65c and 65d are arranged such that their sides extending in the focusing direction Z are opposed to pole surfaces of permanent magnet assemblies 67a and 67b, respectively. In respective magnet assemblies, a pair of magnets are arranged such that magnetizing directions of these magnets are in parallel with each other. As can be seen from FIG. 22, the tracking coils 65c and 65d are arranged on both sides of an axis extending in the direction Y symmetrically, so that a center to a driving force generated by the tracking coils coincides with a center of gravity of a movable portion including the objective lens 61, holding member 62, focusing coils 65a and 65b and tracking coils 65c and 65d. The magnet assemblies 67a and 67b further comprise yokes 68a and 68b having bent portions 69a and 69b, respectively, said yokes being applied on outer surfaces of the magnet assemblies. In the present embodiment, the leaf springs 63a and 63c are shifted in the direction Y with respect to the leaf springs 63b and 63d, respectively.

Now the operation of the present embodiment will be explained. A part of a magnetic flux generated by the magnet 67a flows through the side 66a of the tracking coil 65c into the bent portion 69a and a part of the magnetic flux generated from the bent portion 69b flows through the side 66b of the tracking coil 65a into the magnet assembly 67b. In this manner, the sides 66a and 66b of the tracking coils 65c and 65d are subjected to the magnetic fluxes directed in the direction Y so that the holding member 62 is moved in the direction K.

Upper and lower sides of the focusing coils 65a and 65b extending in the direction Y are subjected to magnetic fluxes generated from major surfaces of one magnets to major surfaces of the other magnets, and thus the holding member 62 is moved in the focusing direction Z.

Also in the present embodiment, a fluidizable damping material is injected into spaces between the upper leaf springs 63a, 63c and the lower leaf springs 63b, 63d to form damping members 70a and 70b. Further, the upper leaf springs 63a, 63c and the lower leaf springs 63b, 63d are relatively shifted in the direction Y. Therefore, the present embodiment can provide a similar advantage to that of the first embodiment.

Figure 23:
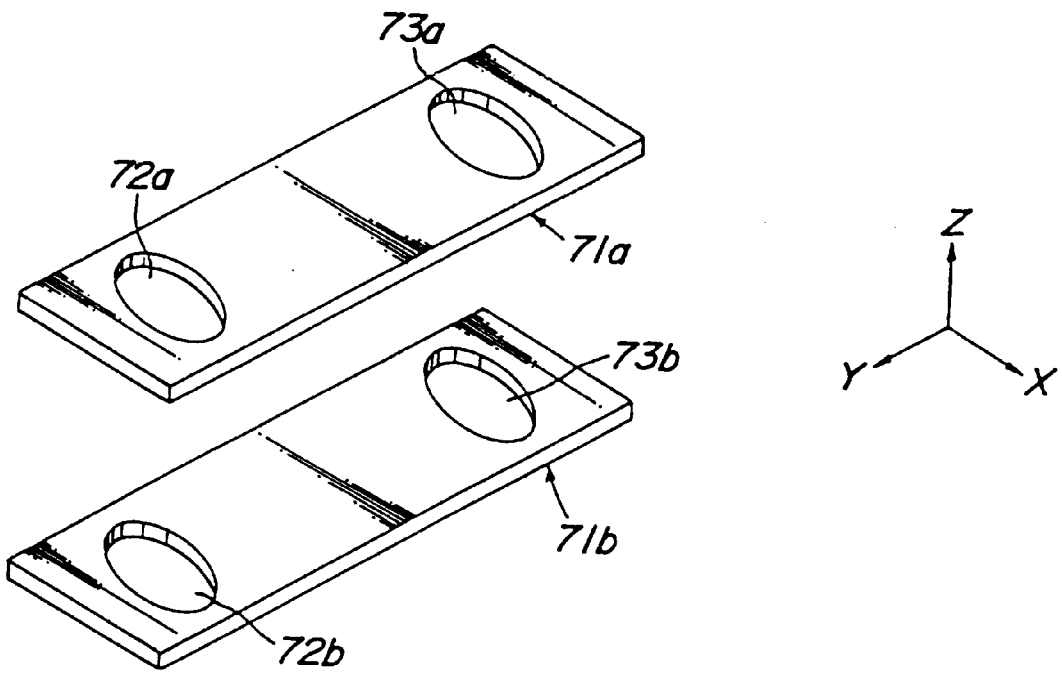
FIG. 23 is a perspective view depicting leaf springs of a sixth embodiment of the optical system supporting apparatus according to the invention.
Figure 24:
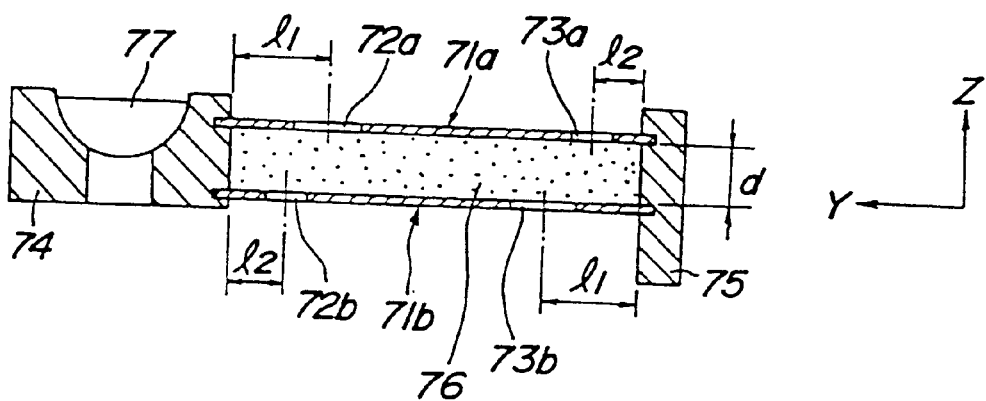
FIG. 24 is a cross sectional view of the sixth embodiment.

FIG. 23 is a perspective view showing a pair of leaf springs in a sixth embodiment and FIG. 24 is a cross sectional view of the supporting apparatus of the present embodiment. In the present embodiment, in leaf springs 71a and 71b are formed elliptical openings 72a, 73a and 72b, 73b at both end portions. As can be understood from FIG. 24, the openings 72a and 73b are formed at positions closer to centers of the leaf springs. In practice, these leaf springs 71a and 71b may be formed in entirely the same the configuration and when they are secured to a holding member 74 holding an objective lens 77 and to a stationary member 75, one of the leaf springs is turned by 180° in a plane of the leaf spring. Then a distance $1_1$ from the holding member 74 to a center of the opening 72a in the upper leaf spring 71a should be longer than a distance $1_2$ from the holding member 74 to a center of the opening 72b in the lower leaf spring 71b.

FIG. 25 is a schematic view illustrating an operation of the supporting apparatus of the present embodiment. When the objective lens 77 is moved in the direction Z, the leaf springs 71a and 71b are deformed. In this case, the deformation of leaf springs at portions near the openings 72a, 72b, 73a and 73b becomes large, because a mechanical strength of these portions is relatively low. Therefore, when the objective lens 77 is moved upward in the direction Z, a distance d' between middle portions of the leaf springs 71a and 71b becomes larger than a distance d in a stationary condition. When the objective lens 77 is moved downward in the direction Z, the distance d' becomes smaller than the distance d. In this manner, the distance d' at the middle portions of the leaf springs 71a and 71b changes largely In accordance with the displacement of the objective lens 77 in the direction Z. Therefore, the amplitude and/or phase of a first order lateral vibration of the leaf springs 71a and 71b are shifted, and thus a deformation of the damping member 76 becomes large and the damping function is enhanced without making the apparatus complicated in construction and large in size.

FIG. 26 is a perspective view depicting a modification of the leaf spring. In the above explained embodiment, there are formed elliptical openings in the leaf spring, but in this modified embodiment, there are formed rectangular openings 78a and 78b.

In the embodiments shown in FIGS. 23–26, it is no more necessary to arrange the leaf springs to be shifted in the direction Y, and therefore construction of the holding member 74 and stationary member 75 can be simplified and manufacturing costs can be decreased. Moreover, a freedom of design can be increased and shifts in amplitude and/or phase of the vibration of the leaf springs can be further increased.

In the present embodiment, the stiffness of the leaf spring is changed locally by forming openings therein, but according to the invention, the stiffness of the leaf spring may be decreased by reducing a thickness locally or may be increased by forming locally stripe-shaped portions causing plastic deformation such that a rigidity of portions of the two leaf springs facing to each other in the direction Z is changed in the direction Y in which the leaf springs extend.

FIG. 27 is a perspective view showing leaf springs of a seventh embodiment of the optical system supporting apparatus according to the invention and FIG. 28 is a cross sectional view thereof. In the present embodiment, in leaf springs 81a and 81b, there are formed bent portions 82a and 82b, respectively at portions slightly deviated from centers of the leaf springs. These bent portions 82a and 82b can be formed easily by bending cut portions by rectangles. As shown in FIG. 28, the leaf springs 81a and 81b are provided between an optical system holding member 83 and a stationary member 84 such that the bent portions 82a and 82b are shifted in the direction Y. In the present embodiment, a fluidizable damping material is injected into a space formed by the leaf springs 81a and 81b to form a damping member 85.

In the present embodiment, the amplitude and/or phase of the leaf springs 81a and 81b are deviated at the bent portions 82a and 82b which are shifted in the direction Y, so that the amplitude and/or phase of not only the lateral vibration in the direction Z, but also the longitudinal vibration in the direction Y are deviated. Therefore, the damping function not only in the direction z but also in the direction Y can be enhanced due to a deformation of the damping member 85 in these directions.

FIG. 29 is a cross sectional view illustrating an eighth embodiment of the optical system supporting apparatus according to the invention. In the present embodiment, between leaf springs 90a and 90b is arranged a damping member 91 made of rubber. The damping member 91 is formed to have a crank-shaped cross section and is secured to the leaf springs 90a and 90b at positions thereof shifted in the direction Y. Therefore, the amplitude and/or phase of the vibration of the leaf springs 90a and 90b are shifted in the direction Y and the damping effect is improved.

Figure 30:
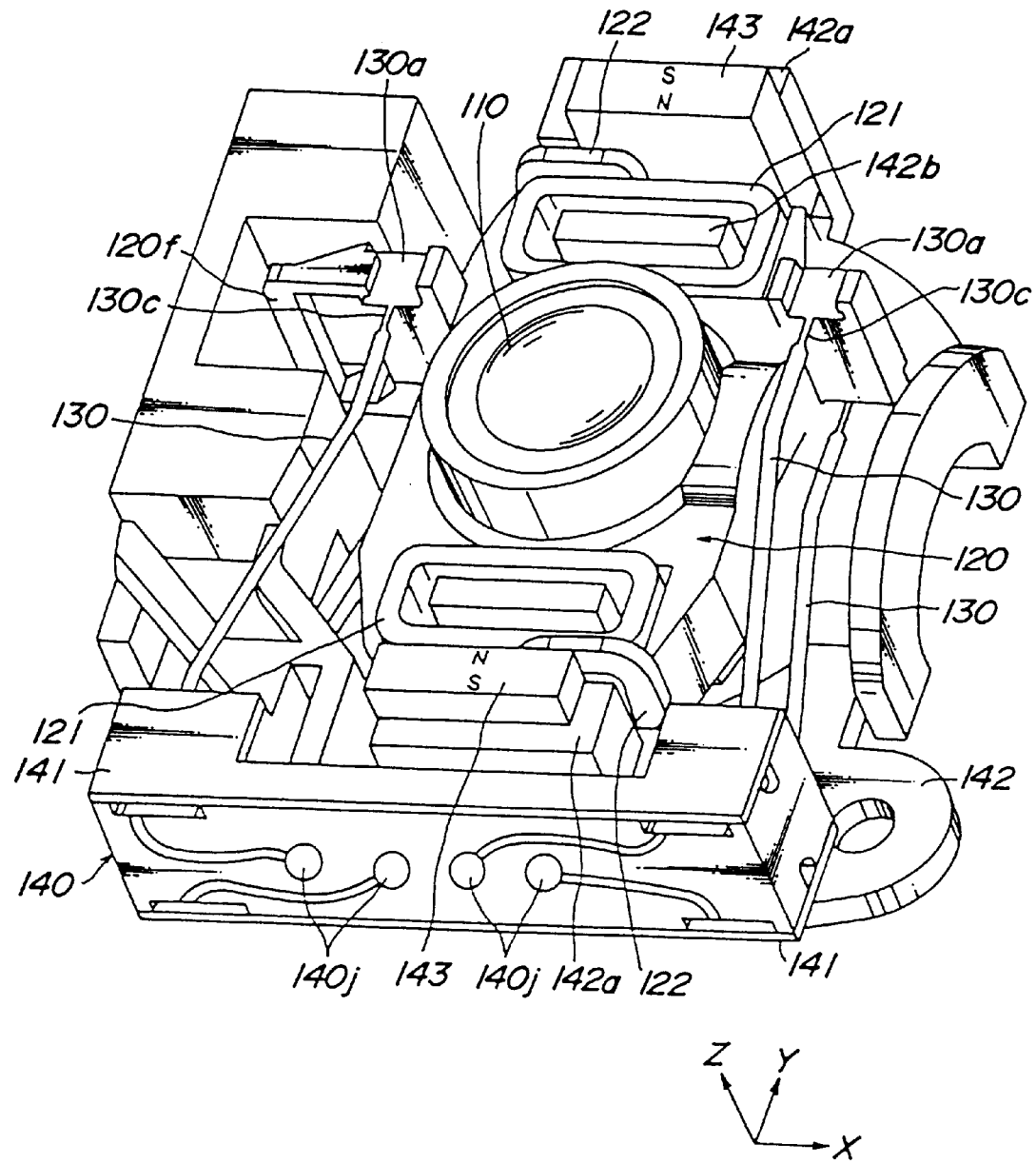
FIG. 30 is a perspective view illustrating a ninth embodiment of the optical system supporting apparatus according to the invention.
Figure 31:
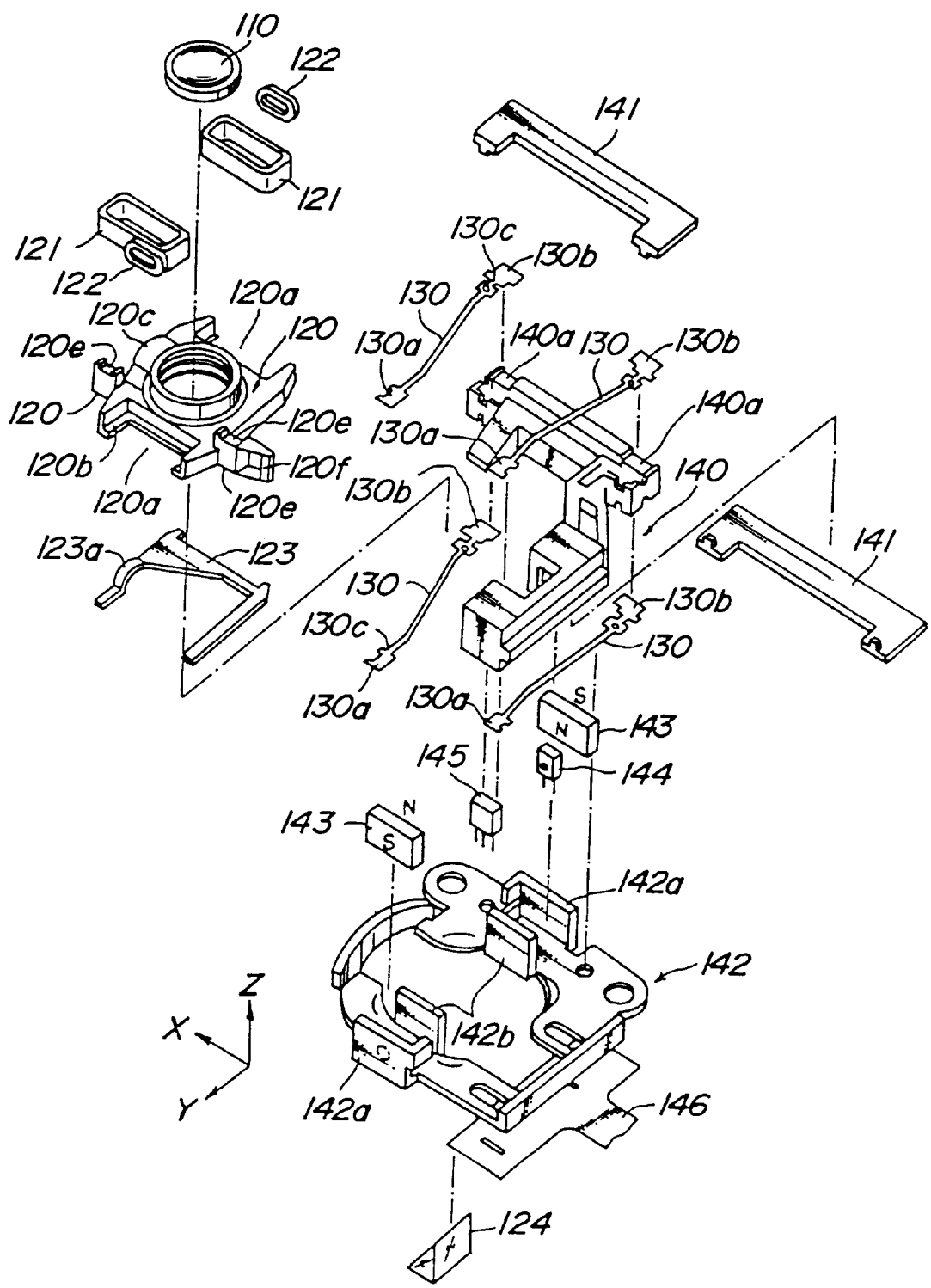
FIG. 31 is an exploded perspective view of the apparatus of the ninth embodiment.
Figure 32:
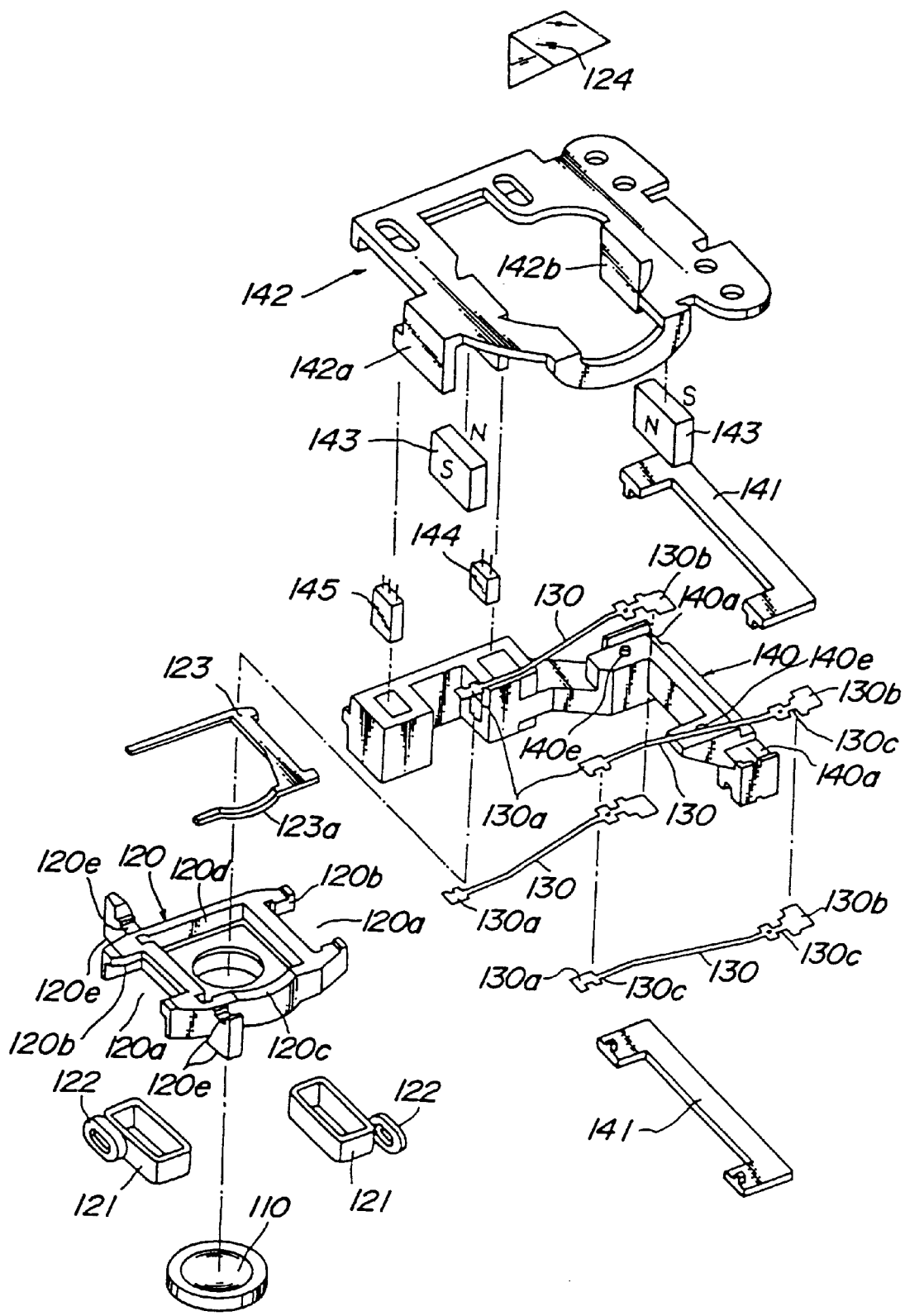
FIG. 32 is an exploded perspective view depicting the apparatus of the ninth embodiment.

FIGS. 30 to 34 show a ninth embodiment of the optical system supporting apparatus according to the present invention. FIG. 30 is a perspective view showing a whole construction of the optical system supporting device, FIG. 31 is an exploded perspective view viewed in the direction of overlook, and FIG. 32 is an exploded perspective view in the direction of lower-side.

As shown in FIG. 30, in this embodiment, the objective lens 110 as an optical element is held with a lens holding member 120, and the holding member 120 is coupled with a stationary member 140 by means of leaf springs 130 (supporting member).

Hereinafter, the construction of the holding member 120, the stationary member 140 and the springs 130 is explained briefly with reference to FIGS. 31 and 32.

At first, the holding member 120 is described.

The holding member 120 for supporting the objective lens 110 is provided at both ends with a notch or concave portion 120a as is shown in FIGS. 31 and 32, and focusing coils 121 and tracking coils 122 are fixed thereto. These notches 120a are provided at its inner surface with projections or convex portions 120b, thereby positioning the attached position of the focusing coils 121.

The present optical system supporting apparatus also comprises a balancer 123 secured along the bottom outer periphery of the holding member 120. This balancer 123 is formed by phosphor bronze plate and serves to increase the warping and the torsional rigidity around the X axis (FIGS. 30 and 31) of the holding member 120 and to increase the resonant frequency of the vibration system. In FIGS. 30 and 31, the X direction is a tracking direction and the Z direction is a focusing direction. In this embodiment, the objective lens 110 is supported movably in any direction of the focusing direction and the tracking direction.

As shown in FIGS. 31 and 32, the balancer 123 and the holding member 120 are provided with concave portions 123a and 120c, respectively, thereby preventing an incident light flux from an optical unit (not shown) to a mirror 124 from being hindered. A concave portion 120d (FIG. 32) at the bottom of the holding member 120 serves to dispose the mirror 124 and the holding member 120 as near as possible, while preventing the contact thereof.

Then, the spring 130 is explained.

The spring 130 is fundamentally secured at its one portion to the holding member 120 and at the other end to the stationary member 140 and is formed by an element or member which serves to support the holding member 120 movably with respect to the stationary member 140. The apparatus in this embodiment utilizes four springs 130 and each spring has one end 130a (FIGS. 30 to 32) adhered to an attaching surface 120e (FIGS. 31 and 32) projected to the side surface of the holding member 120 and another end 130b (FIGS. 31 and 32) adhered to an attaching surface 140a (FIGS. 31 and 32) of the stationary member 140, thereby supporting the holding member 120 movably.

The spring 130 is provided at its ends with a narrow width portion 130c viewed in the X direction, The narrow width portion 130c serves as a flexure and the spring can deform about the flexure to displace or move the holding member 120 in X and z directions.

These four springs 130 are shaped to bend inwardly in the X direction (FIG. 30), and a distance between springs aligned in the direction X becomes large at the side of end 130b of the stationary member 140 rather than the side of end 130a of the holding member 120, so that the dimension of the holding member 120 in the Z direction can be set short and its torsional rigidity about Y axis can be increased.

The spring 130 is also provided with a damping means as explained latter.

Then, the stationary member 140 is explained.

The stationary member 140 is provided at its both ends of upper and lower surfaces with attaching surfaces 140a, thereby fixing the ends of the springs 130 thereto (the construction of these attaching surfaces is described later with reference to the damping means).

The stationary member 140 is secured to a base 142 through a boss 140e of bottom side shown in FIG. 32. The base 142 is formed from a metal sheet by press-forming and comprises outer yokes 142a and inner yokes 142b which are formed in an uniform shape, and magnets 143 are secured to the inner face of the outer yokes 142a, resulting in magnetic circuits (FIGS. 30 to 32).

In FIGS. 31 and 32, reference numeral 44 is a light emitting diode (LED), and reference numeral 45 is a photodector (PD), these elements serving to detect the position of light shielding member 120f of the holding member 120 and to detect the position of the objective lens 110 and its moving speed. Also, in FIG. 31, reference numeral 46 is a FPC for signal transferring and serving to supply signals of the LED 44 and the PD 45 as well as controlling currents for the focusing coils 121 and the tracking coils 122.

In FIGS. 30 to 32, reference numeral 41 is a cover attached to upper side and lower side of the stationary member 140 (described later) and in FIG. 30, reference numeral 140j is a connecting land (described later).

As described above, this embodiment explains the optical system supporting apparatus comprising the lens holding member for supporting the objective lens 110, the lens stationary member 140 and four leaf springs 130 for supporting the holding member 120 movably with respect to the stationary member 140 by attaching one part of the spring 130 to the stationary member 140 and the other part of the spring 130 to the holding member 120, and at least one part of the spring 130 is provided with a damping means.

The damping means is fundamentally constructed by arranging the damping member at predetermined filling portions, such as the periphery of the spring 130 or the like. In this case, the filling portions are preferably provided with units for limiting the position of the damping member.

The filling portions may be provided in the stationary member and/or the holding member.

Figure 33:
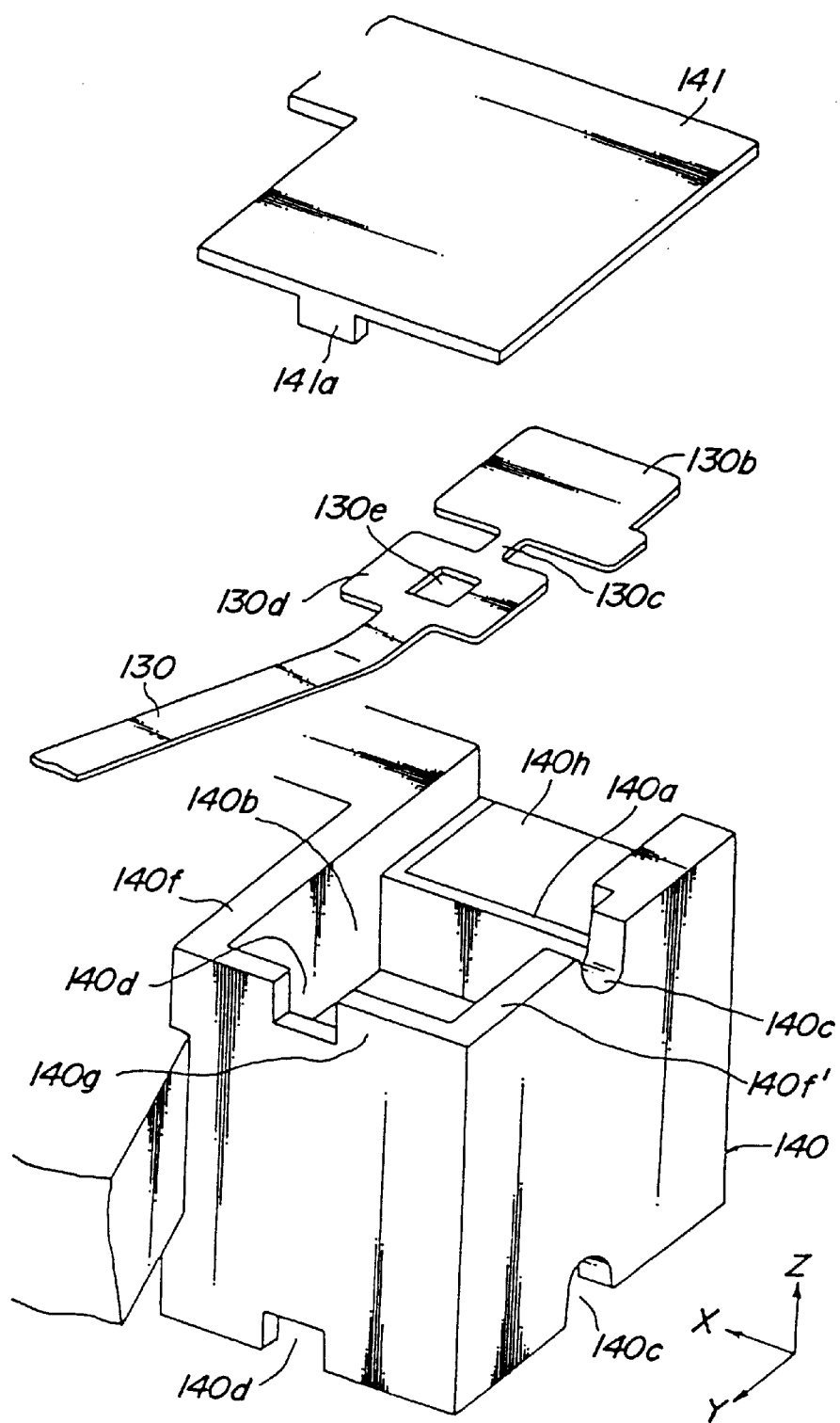
FIG. 33 is a perspective view showing a condition prior to securing a leaf spring to a stationary member.
Figure 34:
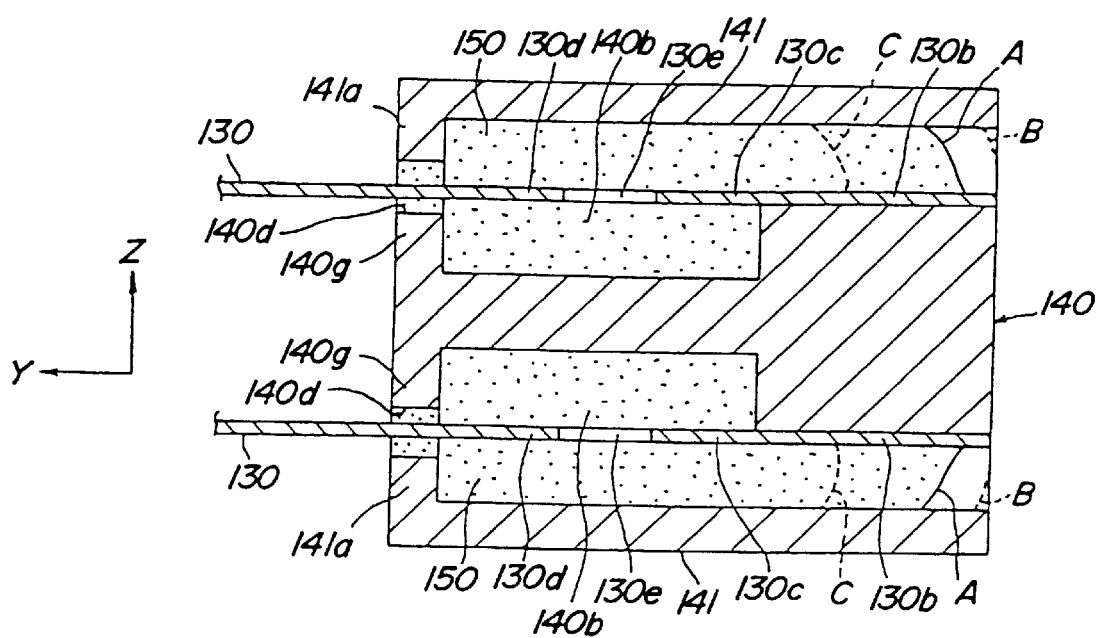
FIG. 34 is a cross sectional view representing the leaf springs and stationary member assembled together.

Then, these damping means and the filling portions are explained as a feature of this embodiment with respect to FIGS. 33 and 34.

FIG. 33 is an exploded perspective view illustrating major parts of the optical system supporting apparatus according to the present invention and FIG. 34 is a cross sectional view illustrating the essential parts thereof. In FIGS. 33 and 34, the connecting portion of the spring 130 and the stationary member 140 are shown in enlarged manner by intervening the damping member therebetween.

In preferred embodiment, as explained herein-after, the position limiting portion of the damping member comprises a first limiting portion positioned in the direction orthogonal to the extending direction of the spring and a second limiting portion positioned at the displacement side of the spring 130 parallel to the extending direction of the spring 130.

In FIGS. 33 and 34, as is shown, the stationary member 140 is provided with the filling portion 140b for filling a damping member 150 therein. As shown in FIG. 33, the filling portion 140b is defined by both walls of the extending spring 130 (wall portions of the stationary member 140) 140f and 140f', longitudinal wall (wall portions of the stationary member 140) 140g and a step portion of the attaching surface 140a, to form a recess in the form of a box, and a part of its side surface (a portion of the wall 140') is provided with a filling hole 140c for filling the damping member. The attaching surface 140a of the stationary member 140 is provided with a copper foil pattern 140h, to which the end 130b of the leaf spring 130 can be soldered.

According to the present invention, the filling portion 140b may be constructed in the form of a substantially complete box.

The copper foil pattern 140h is connected to connection lands 140j (FIG. 30) formed on the surface of the stationary member 140 at the Y (−) side (at side of the direction opposite to the direction of an arrow Y) in FIG. 30, and an FPC 46 (FIG. 31) is soldered to the connection lands 140h, thereby applying the current from an external supply source. The copper foil pattern 140h can be formed on the surface of stationary member (the surface of the attaching surface 140a) by so called MID such as selective plating or the like.

As shown in FIG. 33, the leaf spring 130 is provided with a wide width portion 130d as a resistance increasing means adjacent to a flexure portion 130c, and the wide width portion 130d is provided with a hole 130e substantially at its center portion.

The wide width portion 130d is extended in the width direction as shown in FIG. 33, so that the dimension of the opening area of the filling portion 140a of the stationary member 140 is set in such a manner that the wide width portion 130d may be accommodated therein.

When the end portion 130b of the spring 130 is soldered to the attaching surface 140a of the stationary member 140, the wide width portion 130d of the spring 130 is arranged in the filling portion 140b, or the portion of the spring 130 extending at the side of the other end portion 130a from the wide width portion 130d and arranged in the filling portion 140b is led out through an opening 140d provided at upper edge of the wall 140g of the stationary member 140.

Then, in order to attach the leaf spring 130, as shown in FIG. 33 (also, FIGS. 30 to 32), a cover 141 may be secured to the stationary member 140. The cover 141 has a projection or convex portion 141a as shown in FIG. 33. The attachment of the cover 141 to the stationary member 140 is performed in such a manner that the cover convex portion 141a is fitted in the opening 140d of the wall 140g so as to form a slight clearance between the spring 130 and the opening 140d.

In the step of cover attachment, the dispositional relation among the stationary member 140, the leaf spring 130 and the cover 141 is shown in FIG. 34. The body portion of the spring 130 is extended to the holding member 120 in the left direction from the opening 140d (FIGS. 30 to 32), and the wide width portion 130d of the spring 130 having the hole 130e is disposed at the space as the filling portion 140b. The space formed between the stepped portion (the attached surface 140a) of the stationary member 140 for fixing the spring end 130b or the like and the inner surface of the cover 141 forms a space portion having comparatively small volume (the portion shown by the sign A, B and C in FIG. 33).

After attachment of the cover, as shown in FIG. 34, under the condition that the wide width portion 130d of the spring 130 is placed in the inner side of the space, the damping member 150 is filled in the filling portion 140b from the filling hole 140c and cured by, for example, illuminating with ultraviolet rays. That is, if such a curing damping member is used the cover 141 and stationary member 140 may be formed by plastic material which transmits ultraviolet light. In this embodiment, polycarbonate, polyethersulfon or the like transmitting ultraviolet light may be used as the material of the plastic cover 141 and the stationary member 140, and the gel agent of ultraviolet curing type having a principal component of modified urethane acrylate (acryl) is used as a damping member 150.

The hardness of the damping member after curing is preferably 1 in Shore hardness A.

In filling of the damping member 150, if the dispenser capable of quantative-exhaunting, with micro-quality of 1 mm³, is used, the filling amount of the damping member 150 may not be dispersed.

In the apparatus of this embodiment, the above described leaf spring 130, the stationary member 140 and the connection construction are mounted on the respective end portions of the stationary member for each of four springs, and even in the addition of the damping member during assembly of the apparatus the filling range of the damping member 150 is limited suitably, so that the quantity of the damping member adjacent to the spring 130 has small dispersion. Also, when driving the lens in the vertical and horizontal directions, in the case of focusing and tracking control, the fluctuations of the damping characteristic and the resonance frequency becomes less, thereby obtaining stable servo characteristics. Moreover, a volume of the damping member 150 can be easily adjusted and a fluctuations is the amount of the injected fluidizable damping material can be mitigated.

The effect and function of the damping operation in the optical system supporting apparatus in this embodiment are explained hereinafter.

In the optical information recording and/or reproducing apparatus, the light flux from a light source unit (not shown) is projected onto the recording medium through the mirror 124 and the objective lens 110 of the holding member 120, thereby writing and reading the information.

In such a recording and/or reproducing, control currents are supplied to the focusing coil 121s and the tracking coil 122 through the springs 130 from the connection land 140j in order to control focusing and tracking, and the spring 130 in moved by the vibration of the holding member 120, thereby deforming the damping member 150, resulting in a damping of an undesired first order resonance with its viscous elasticity.

In this case, by the vibration in the vertical (Z) direction of the holding member, the portion of the spring 130 at the left side becomes movable in the vertical direction and thus the wide width portion 130d of the spring 130 operates so as to increase the damping resistance, thereby increasing the damping effect. For the vibration in the horizontal (X) direction (FIG. 30), the hole 130e holds the damping member 150, so as to increase the damping resistance, thereby increasing the damping effect.

In this embodiment, the damping member 150 having the above damping effect is filled in the space enclosed by the wall 140f, 140f' and 140g of the stationary member 140, the cover 141 and its convex portion 141a as shown in FIG. 34.

In this construction, in the direction in which the spring 130 is extended outward from the side of the stationary member 140, the wall 140g, and the cover convex portion 141a are provided, so that the damping member 150 has large fluid resistance, because of the small space, so that it is hard for the damping member 150 to flow out to the Y (+) side from the opening 140d (in the left direction in FIG. 34).

On the contrary, the Y (−) side viewing from the opening portion 140d has a large space, so that the damping member 150 is liable to flow into this apace.

As is seen from the above, this embodiment takes the following steps and obtains the following function and effect.

In assembling the apparatus, as to the filling operation of the fluidizable damping material for forming the damping member 150 by the above described dispenser, generally, the following steps may be taken, That is, in the came of the damping member of standard amount, the injection amount of the damping material (standard amount) is so set that the end portion of the damping member 150 to be inserted in the space is positioned at the place shown by sign A in FIG. 34.

Considering that if during the filling operation, an amount of the damping material fluctuates, (an injected amount of the damping material might be deviated from the standard value previously Bet as a reference amount by operator or the other factor, resulting in an over injection amount, or an under injection amount), the end position of the damping member 150 shown by the solid line A may vary between the positions shown by broken lines B or C in FIG. 34, Even if the back end position of the damping member 150 is moved as shown by the reference characters A, B and C, however, the portion of the spring 130 is the end portion 130*b* fixed to the stationary member 140 as shown in FIG. 34. Therefore, the spring end portion 130*b* is fixed to the stationary member as described above, and thus does not move as differing to the portion of the spring 130 deviated at the side of the opening 140*d*, so that even if a position up to which the damping member 150 extends near the end portion 130*b* of the spring 130 is changed, the damping characteristics and the resonance frequency are not effected.

Even if an amount of the injected damping material is dispersed, therefore, the effect of the spring 130 as the supporting means can not be substantially decreased, so that the desired damping operation as described above can be exhibited and the focusing control and the tracking control can be performed precisely.

As described above, according to the present invention, the optical system supporting apparatus having the following advantageous effects can be obtained on the basis of the above construction.

The filling portion for the damping member is so constructed that walls are provided in the direction orthogonal to the extending direction of the supporting member as well as in the extending direction on a side on which the deformation of the supporting member is large. Therefore, there is constructed the limiting means for limiting a flow out of the fluidizable damping material from the filling portion.

A space is also provided in the portion in which the supporting member is displaced, that is, in which the damping characteristics and the resonance frequency are not subjected to the effect of fluctuation, even though an amount of the damping member is fluctuated, so that a variation in an amount of the injected damping material can be absorbed.

Therefore, the effect of a fluctuation of an amount of the injected damping material on the supporting member effectively can be made small, and thus the fluctuation of the damping characteristics and the resonance frequency can be made small.

According to the optical system supporting apparatus of this embodiment, since the wide width portions 130*d* and 130*e* are provided as a resistance increasing means, the contact area of the supporting member and the damping member is increased and thus the damping performance can be improved. Moreover, the damping coefficients in the X and Z directions (FIGS. 30 and 33) can be set optionally by changing the shape, dimension and the position of the wide width portion 130*d* and the hole 130*e*.

If a dispersion of an amount of the damping material is adjusted by the adjusting portion, a fluctuation of an amount of the damping material of the effective portion thereof can be made small, particularly, if the adjusting portion is placed at the side of the stationary portion that the damping member is not displaced to a large extent, even though a fluctuation in the damping characteristics and the resonance frequency can be restrained as compared with the dispersion and thus the range capable of permitting the dispersion of the damping member can facilitated be increased, resulting in easy of workings.

Now a tenth embodiment of the present invention will be explained with reference to FIGS. 35 and 36.

Constructional portion other than essential portions explained hereinafter may be the same as in the over all ninth embodiment. The constructional view of the optical system supporting apparatus is omitted.

Figure 35:
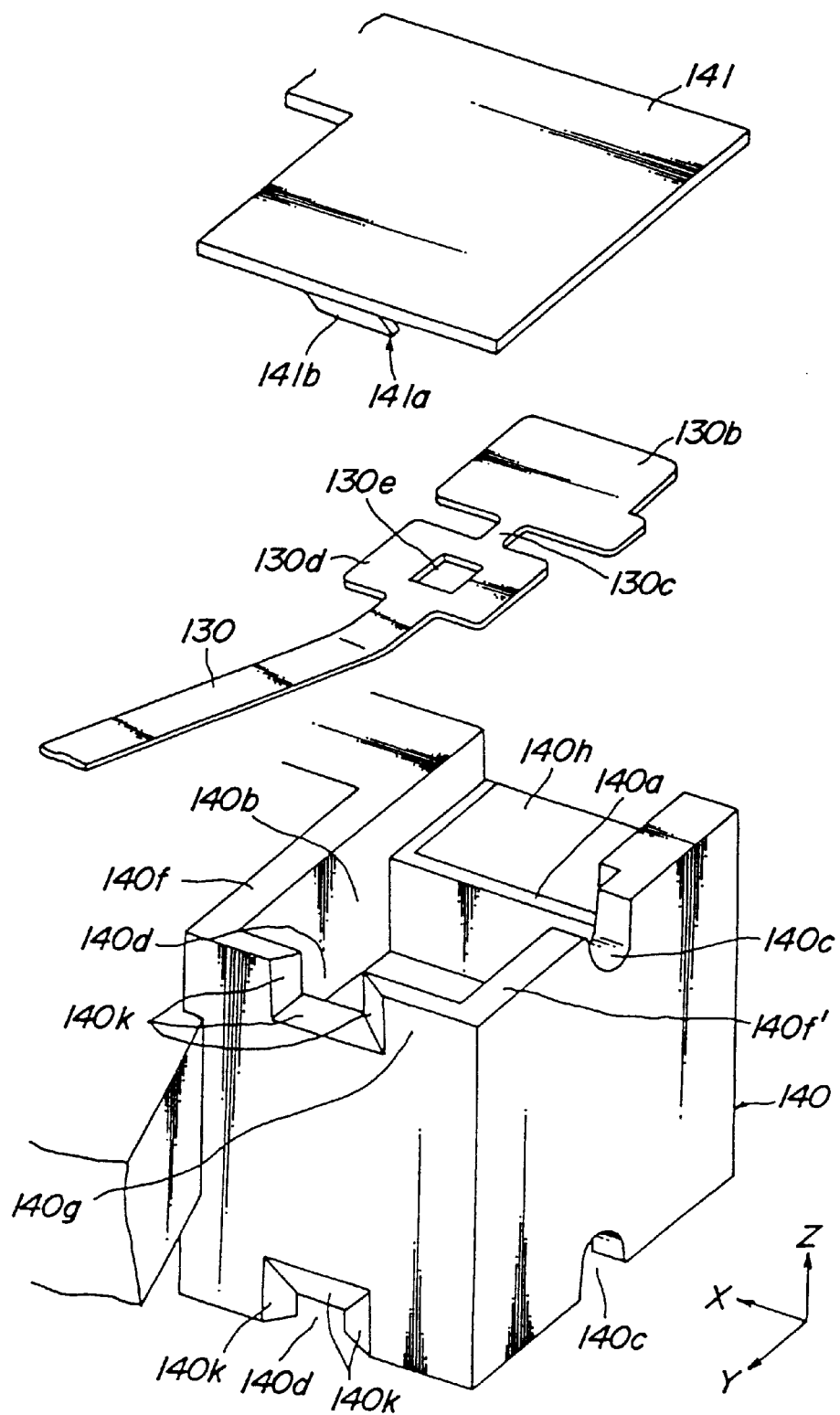
FIG. 35 is a perspective view showing a leaf spring and a stationary member prior to assembling in a tenth embodiment of the apparatus according to the invention.

FIGS. 35 and 36 are an exploded perspective view and an enlarged sectional view each illustrating the construction of the essential portion of this tenth embodiment.

As shown in FIGS. 35 and 36, in this embodiment, the opening portion 140*d* of the wall 140*g* of the stationary member 140 and the convex portion or projection 141*a* of the cover 141 are provided with beveled portions 141*k* and 141*b*, respectively, so as to widen the opening in the direction of Y (+) side. The chamfering direction is the direction in which the area of the rectangular opening portion formed at the wall portion 140*g* under the condition of combining the stationary member 140 and the cover 141 and including the beveled portion 141*b* of the cover convex portion 141*a* becomes gradually widened outward.

According to this embodiment, the provision of such beveling can obtain the following function and effect in addition to the function and effect exhibited by the ninth embodiment.

Upon injecting a fluidizable damping material in order to constitute a damping member 150, the damping material is squeezed out of a filling portion 140*b* to the Y (+) side through the opening portion 140*d* as shown in FIG. 36. In this case, if a squeezed out amount (volume) of the damping material it assumed to be the same as in the ninth embodiment, a length m of the squeezed out portion of the damping member 150 becomes short as compared with that shown in FIG. 34, so that according to this feature, a portion of the leaf spring 130 which is brought into contact with the damping member 150 becomes short.

If the spring 130 is bent or sagged in the Z direction (FIG. 36), as compared with the ninth embodiment (refer to FIG. 34), the opening portion 140*d* is provided with the beveled portions 140*k* and 140*b*, so that the plane parallel to the spring 130 does not present and thus the damping member 150 is apt to escape in the direction of arrows in FIG. 36. As shown in FIG. 35, the beveling 140*k* is provided to right and left side surfaces of the opening 140*d*, so that if the spring 130 is sagged in the X direction (refer to FIG. 35), the same functional effect as discussed above can be obtained.

In this way, the filling portion near the supporting member (in this embodiment, the spring) is provided with bevelings so as to make the plane parallel to the supporting member small, so that a change in a length of the damping member becomes small in the case that an amount of the damping material is small. Moreover, the force of the beveling effected on the supporting member becomes small, so that fluctuation of the damping characteristics and the resonance frequency also small.

FIG. 37 shows a modification of the tenth embodiment.

As shown in FIG. 37, this embodiment utilizes a holding member 160 and a wire 161 having a circular cross section as a supporting member.

The holding member 160 is provided with a hole 160*a* in which the wire 161 having a circular cross section is inserted for positioning, and a filling portion 160*b* as an opening portion following thereto for filling the damping member 150. As shown in FIG. 37, the end of the opening portion at the large movement side of the wire 161 is provided with a beveling 160*c*. The direction of the beveling 160*c* is the same direction as in the tenth embodiment.

In this way, the beveling may be provided to the opening portion of the filling portion at which fluent of the damping member is not limited, at the large movement side of the supporting member (in this embodiment, wire).

When as in the same manner as described in the ninth embodiment, an amount of the damping material to be made as reference previously is set and its standard amount of the damping member 150 is used, if the end portion of the damping member 150 is positioned to the beveling 160c as shown in FIG. 37, even though the filling amount of the damping member is fluctuated due to dispersion thereof, the fluctuation of the length L of the damping member 150 due to the fluctuation of the damping member 150 can be made small as shown in FIG. 37.

According to this embodiment, also, it is difficult to disperse the amount of the damping member 150, and even if the amount is dispersed, the effect of the dispersion on the supporting member may be small, thereby obtaining a stable servo characteristics.

Figure 6B:
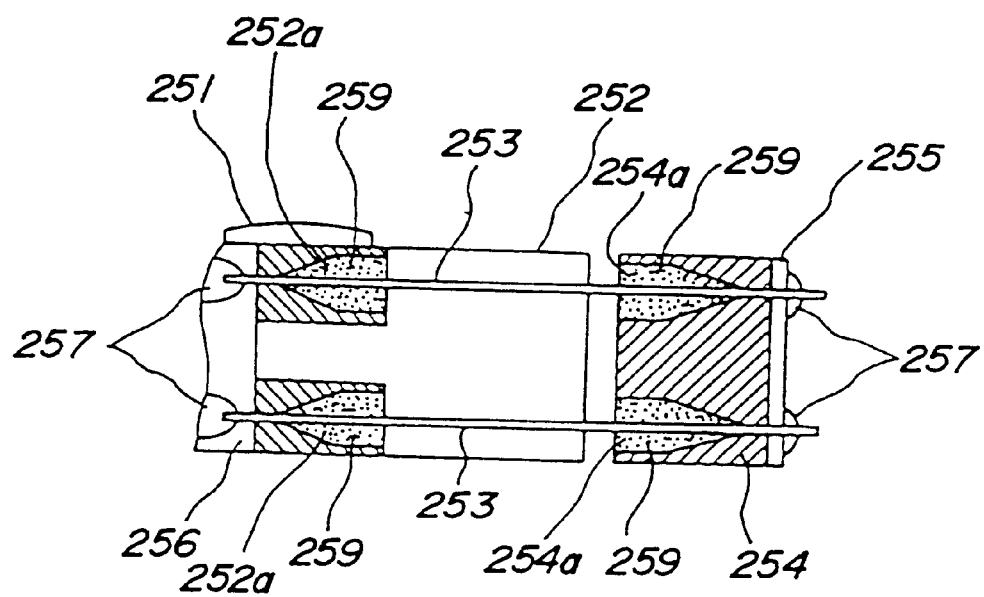
Figure 8:
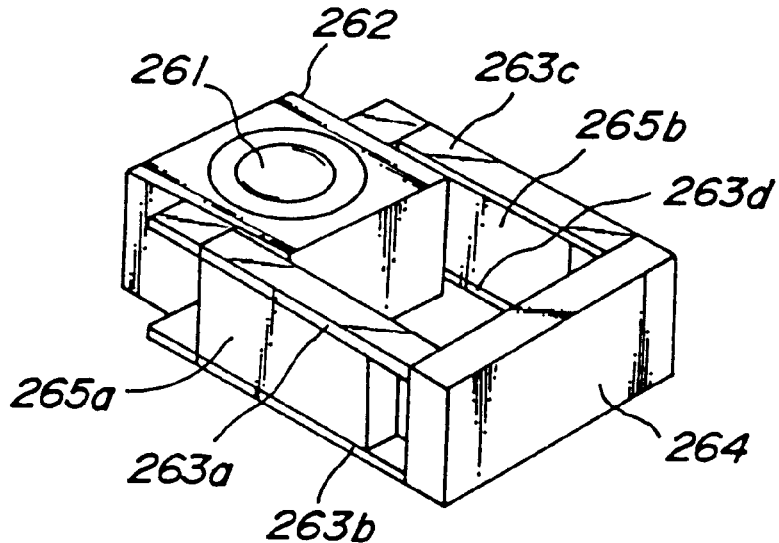
FIG. 8 is a perspective view showing another known supporting apparatus.
Figure 9:
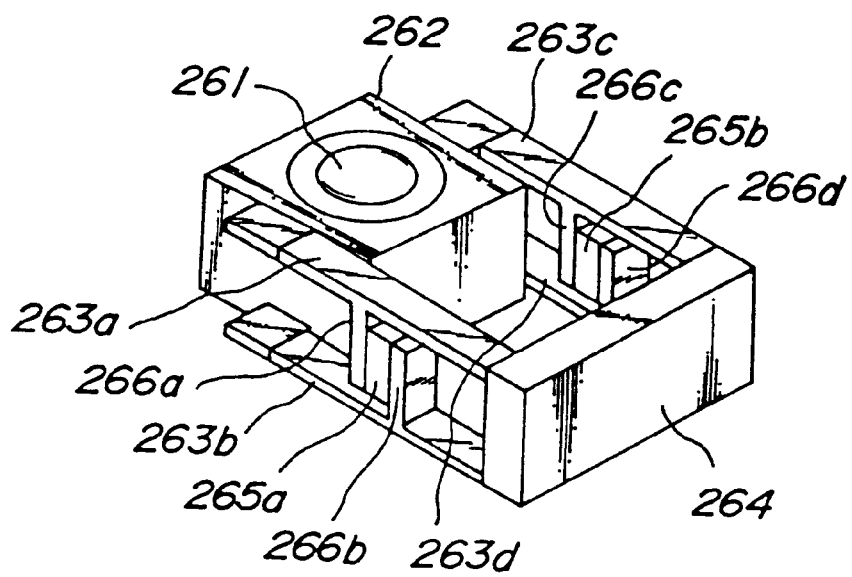
FIG. 9 is a perspective view illustrating another Known supporting apparatus.

In this way, even if this embodiment is compared with the conventional supporting apparatus using such a wire shown in FIGS. 6A and 6B, the length L of the damping member 150 as shown in FIGS. 7A and 7B caused by the dispersion of amount of the damping material to be filled may be prevented from being changed largely, as considered with reference to FIGS. 7A and 7B, and thus the change or the like of the resonance frequency of the supporting member in accompanying with the change of the length L can be preferably prevented.

This embodiment of the present invention may be applied to the optical system supporting apparatus comprising the holding member, the stationary member, the supporting member for supporting the holding member having a part fixed to the stationary member and another part fixed to the holding member movably to the stationary member.

An eleventh embodiment of the present invention will be explained with respect to FIGS. 38 and 39. This embodiment corresponds to the variation of the ninth embodiment and utilizes a leaf spring 130 as shown in FIGS. 38 and 39 and a stationary member 140.

As shown in FIG. 38, wide width portions 130d of a leaf spring 130 are bent downward (in the direction toward inner side the filling portion 140b of the stationary member 140) by an angle θ, wherein θ is about 30 to 90 degrees. These bent wide width portions are portions projected in the direction orthogonal to the extending direction of the spring 130. The bent wide width portions 130d are also provided with holes 130e, respectively.

While the fixing member 140 has wall portions 140f, 140f' and 140g, the height of these wall portions is made lower than that of the attaching surface 140a by, for example, 0.1 to 1 mm (the copper foil pattern 140h is not shown). The end portion of respective wall portion 140f, 140f' and 140g corresponding to the opening of the filling portion is provided with a beveling 140k. The direction of the beveling 140k is the same as that of the previous embodiments and the direction in which the area of the opening portion of the filling portion 140b becomes gradually widened outward.

As shown in FIG. 39, damping member 150 is formed by injecting a fluidizable damping material into the filling portion 140b. In this case, a height of the damping member 150 (the position of surface of the damping member 150a) is generally positioned at a middle of the beveling 140k. This technique is similar to the previously explained technique. An amount of a damping material to be injected into the filling portion 140b is previously met as a reference, so that when the damping material of this reference volume is injected, the surface 150a of the damping member 150 is positioned at the middle of the beveling 140k as shown in FIG. 39.

In this embodiment, the cover 141 for defining the filling portion of the damping member is not used.

This embodiment is one example of combinations of the spring 130 having the bent wide width portions 130d, and thus as shown in FIG. 39, the downward extending portions of the wide width portions 130d of the spring 130 and the holes 130e are positioned in the above damping member 150. That is, in this embodiment, the projections, i.e. both sides of the bent wide width portion are projected downward and sideward in the extending direction of the supporting member and are immersed in the damping material. Concretely, only the periphery of the bent wide width portion 130d in the direction orthogonal to the extending direction of the leaf spring is brought into contact with the damping member 150 filled in the filling portion 140b.

According to this embodiment, the following advantageous effects are obtained in addition to the function and effect obtained in the ninth embodiment.

Even if an amount of the injected damping material is dispersed, the length of the supporting member being brought into contact with the damping member in the extending direction thereof is not changed.

The beveling (140k) is provided so as to widen the opening of the filling portion of the damping member, so that even though an amount of the injected damping material is dispersed, a height of the damping member (the volume of the damping member in the Z direction in FIGS. 38 and 39) is changed only slightly.

The filling portion (140b) of the damping member (150) is formed in a complete box shape and does not have a slit, so that the damping material is injected in the filling portion and does not flow out toward the periphery.

If it is necessary to make the damping amount large, the wide width portion 130d and the filling portion may be made large in the direction orthogonal to the extending direction of the spring 130. In this way, even if the damping amount must be large, it is possible to respond to this requirement. Even in this case, the apparatus does not become large in the extending direction of the supporting member (the spring 130).

The filling portion 140b is positioned in the side direction of the spring 130, so that the spring 130 can be secured to the stationary member 140 after filling the fluidizable damping material of the damping member 150 into the filling portion 140b.

Therefore, the following advantageous effect can be obtained.

(a) The degree of freedom of the working steps is large.

(b) Even when the gap between the wide width portion 130d and the walls 140f, 140f' and 140g of the filling portion of the stationary member is small (in the case of small and compact structure of the filling portion as compared with the case of large gap), the fluidizable damping material of the damping member 150 can be injected sufficiently up to the innermost part of such a large filling portion.

In assembling the optical system supporting apparatus, the material of the damping member 150 can be injected without irregularity, and thus the apparatus capable of exhibiting a desired stable damping effect can be provided.

Particularly, when the high viscous damping material is injected later, if the construction is more compact, it is apt to retain air in the innermost part of the filling portion, so that in assembling the apparatus, careful workings and management are performed in order to prevent the retention of air. According to this embodiment, such a troublesome operation and the number of such steps can be decreased.

(c) When the damping member is made of thermoset gel or ultraviolet-cured gel or the like, a fluidizable damping member injected into the filling portion may be cured prior to securing the leaf spring, so that only the stationary member may be prepared, thereby making the cost of the preparation low.

For a damping member made of gel, if the spring is inserted later, a projection area of the portion to be inserted of the spring (wide width portion of the spring) viewed in an inserting direction is preferably made small, so that the bent angle is preferably set to θ=90°.

In this case, the spring can be inserted easily and a stress is not remained in the gel.

When the bending angle θ is made small, a projection area in Z direction (FIG. 38 or the like) becomes large and thus the damping amount becomes large in this direction.

The damping amounts in X and Z directions may be changed or adjusted by changing the bent angle. For example, if θ=45°, the damping amount in X and Z direction may be equal.

FIGS. 40A to 40D show several modifications of the leaf spring of the eleventh embodiment.

Figure 40A:
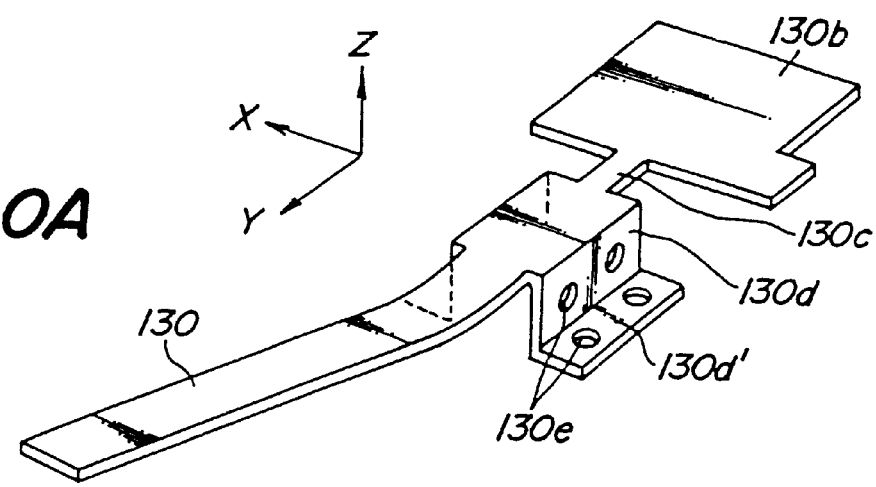
FIGS. 40A–40D are perspective views showing several modifications of the leaf spring.

As shown in FIG. 40A, the tip portion of the bent wide width portion 130d of the spring 130 is further bent to form a tip bent portion 130d' and two holes 130e are also provided in the bent wide width portion 130d and the bent tip portion 130d', respectively, so that eight holes 130e in total are provided in the wide width portion and the bent top portion.

Therefore, in this case, particularly, the projection area of the spring wide width portion becomes increased in the Z direction, and thus the damping performance in the Z direction can be increased. Moreover, the damping amounts can be set more finely and separately in the X and Z directions by changing the areas of these wide bent width portion 130d and the bent tip portion 130d' and a size of the holes 130e which are embedded in the damping member as illustrated in FIGS. 39 and 40.

Figure 40B:
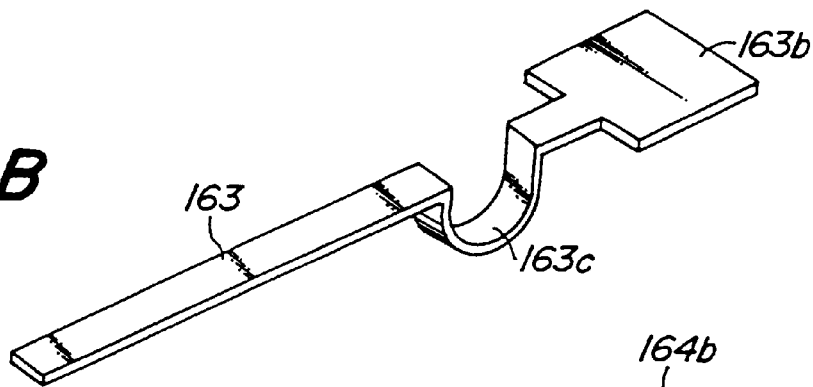

In a second modification shown in FIG. 40B, a semicircular arch portion 163c is provided near the end portion 163b of the spring 163. This arch portion 163a is also positioned in the damping member in the same manner as described in the above embodiments.

Figure 40C:
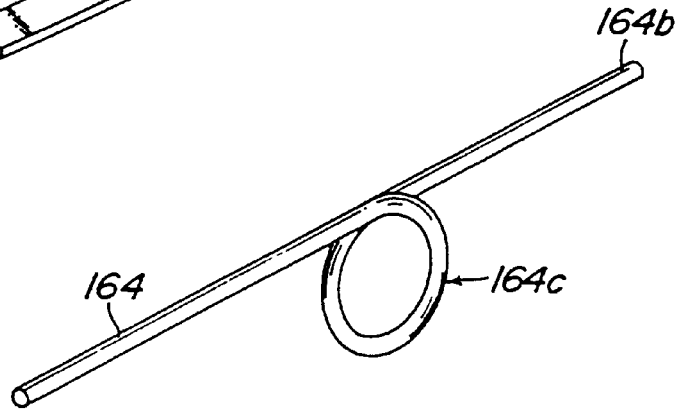

In a third modification shown in FIG. 40C, the wire shaped spring 164 having a circular section is used, and a part of the wire spring 164 is bent near the end portion 164b thereof to form a loop portion 164c. This loop portion 164c is also positioned in the damping member as in the same manner described in the above explained eleventh embodiment. The wire spring can be manufactured in a less expensive manner.

Figure 40D:
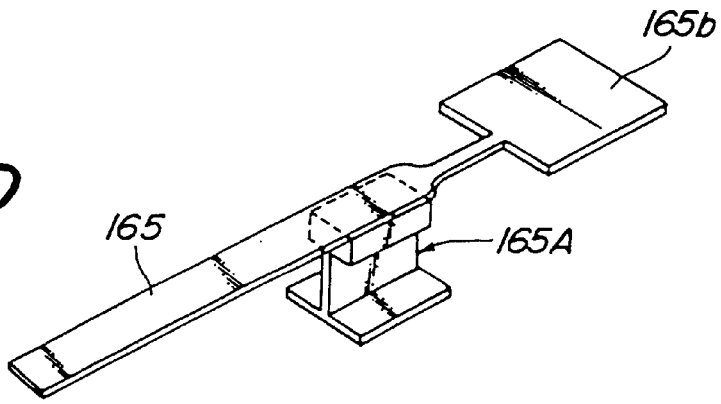

FIG. 40D show a fourth modification of the eleventh embodiment. In this modification, a member 165A which is formed separately from a leaf spring 165 is fixed to the leaf spring, thereby forming the wide width portion near the end portion 165b of the spring 165. In this way, the wide width portion of this another member 165A is positioned in the damping member. In this case, the freedom in designing the spring wide width portion becomes large.

A twelfth embodiment of the optical system supporting apparatus of the present invention will be explained with reference to FIG. 41.

Figure 41:
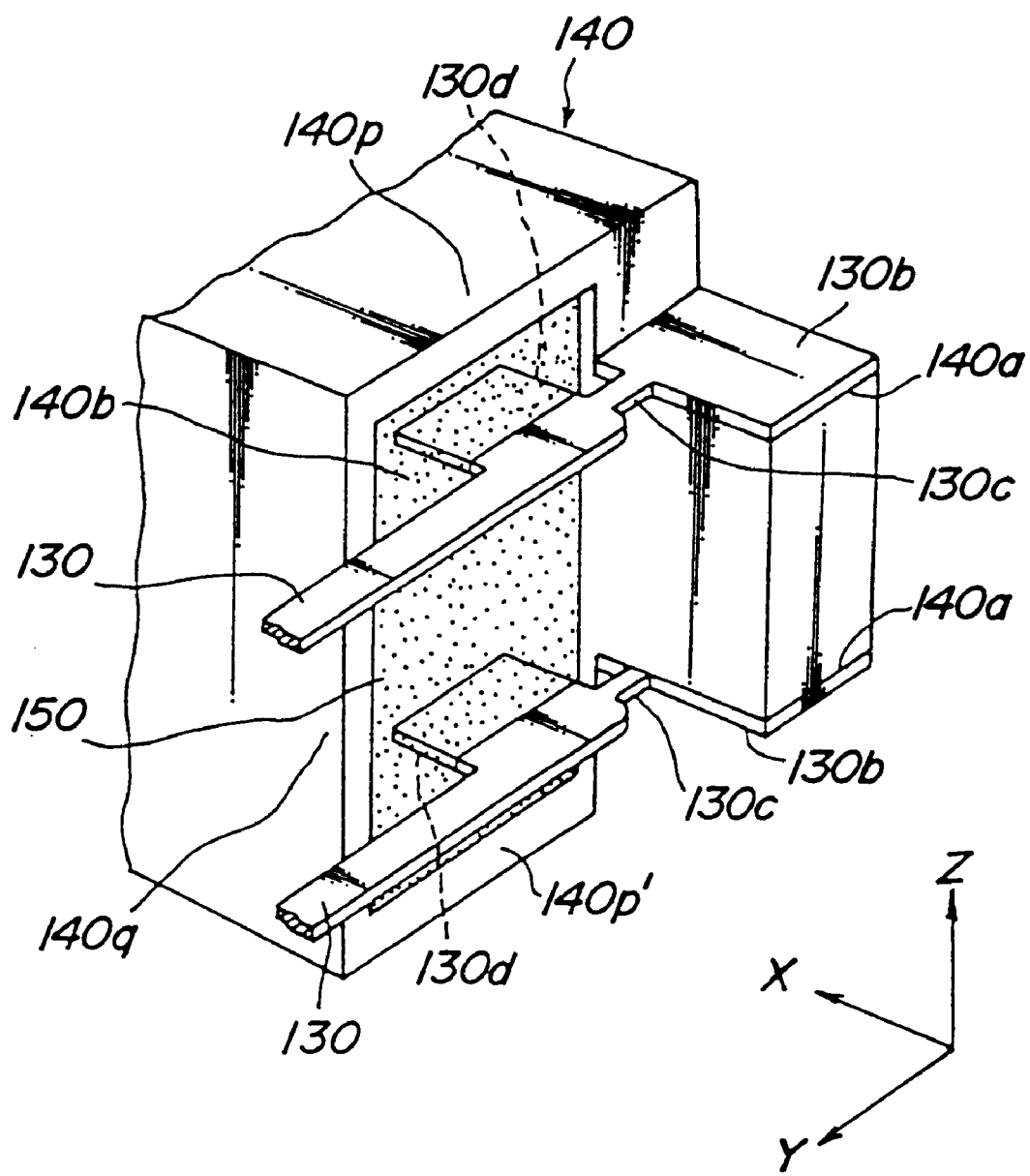
FIG. 41 is a perspective view illustrating a twelfth embodiment of the optical system supporting apparatus according to the invention.

In this embodiment, a spring 130 and a stationary member 140 are utilized as shown in FIG. 41. The spring 130 is provided with a wide width portion 130d extending sideward from one side end of the spring straightly, near its end portion 130b and a flexure portion 130c. The end portion 130b of the spring 130 is secured to an attaching surface 140a of the stationary member 140. In this case, the filling portion 140b for the damping member 150 is formed in the stationary member 140 in the direction (X direction) in which the wide width portion 130d of the spring 130 is projected.

As snown in FIG. 41, the spring wide width portion 130d is positioned in the damping member 150, so that only the periphery of the wide width portion 130d is contacted to the damping member 150 filled in the filling portion 140b. In this case, as shown in FIG. 41, as filling portion for the damping member 150, one filling portion 140b is provided for a pair of two springs 130, 130, which are provided vertically. This common filling portion 140b is formed by walls 140p, 140p' opposite in the vertical direction (Z direction) and a wall 140g provided so as to interconnect these walls 140p and 140p'. The other constructional portions may be fundamentally the same as those of the ninth embodiment, so that its detailed explanation is omitted.

According to this embodiment, the following advantageous effects can be obtained.

It is not necessary to bend a part of the spring 130, so that the apparatus becomes inexpensive. The damping for the two parallel springs 130 and 130 is performed by one filling portion, so that even in the case of construction utilizing four springs for the stationary member 140 (FIGS. 30 to 32), only two filling portions are necessary, so that in assembling the apparatus, the number of the steps for injecting the damping material can be decreased.

Figure 42:
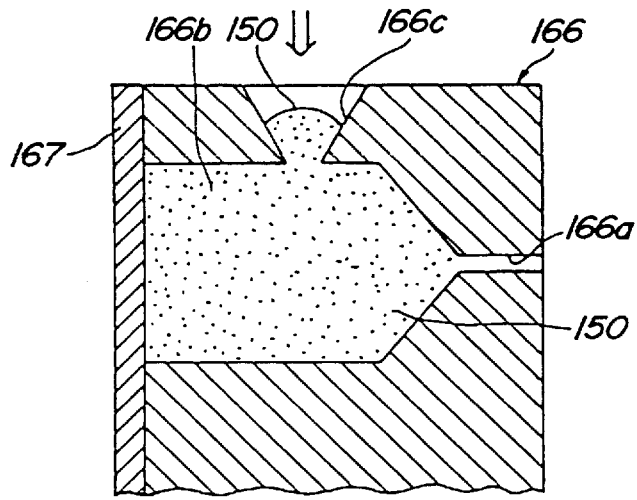
FIG. 42 is a cross sectional view depicting a thirteenth embodiment of the optical system supporting apparatus according to the invention.
Figure 43:
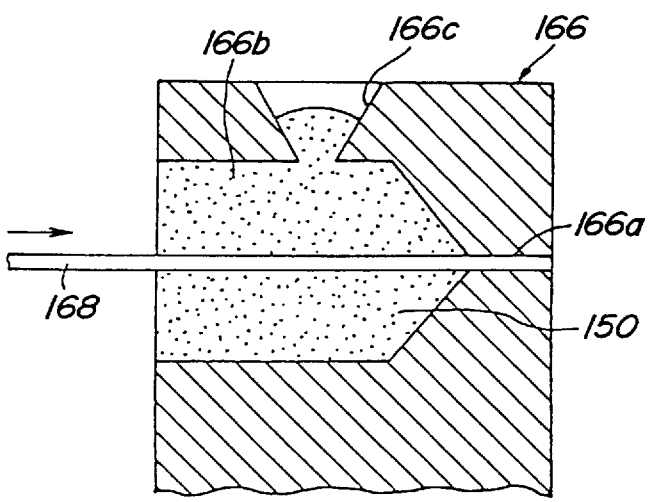
FIG. 43 is a cross sectional view of the thirteenth embodiment.

Even when the projections are formed in the supporting member in the direction orthogonal to the extending direction thereof and only the periphery of the projections is contacted to the damping member filled in the filling portion, the present invention may be carried out under the mode in which the projection is made the bent portion of the supporting member, the mode in which the projection is made a portion projected in the inner direction to the plane of the supporting member, or the mode in which the projection is made another member secured to the supporting member in uniform shape, or the other mode, and including the construction rather than the eleventh embodiment shown in FIGS. 38 and 39, Next, a thirteenth embodiment of the present invention will be explained with reference to FIGS. 42 and 43.

FIG. 43 is a sectional view of essential portion of the present embodiment corresponding to the sectional views of essential portion of FIG. 34 of the ninth embodiment, of FIG. 36 of the tenth embodiment, of FIG. 39 of the eleventh embodiment, This embodiment utilizes the stationary member 166 shown in FIGS. 43 and 43, and in assembling, the cover 167 as a cover for the opening of the filling portion as shown in FIG. 42. In this embodiment, also, a wire shaped spring 168 (FIG. 43) is utilized as a spring for the supporting member.

As shown in FIG. 42, the stationary member 166 is provided with a securing hole 166a for positioning the wire spring 168, a filling portion 166b for the damping member 150 and an injection hole 166c. The injection hole 166c to be communicated with the filling portion 166b is positioned over the filling portion 166b and the injection hole 166c is widened at its inlet side as shown in FIG. 42. The shape of the injection hole 166c viewed from above may generally be circular, but a rectangular or the other shape may be used as long as the hole is widened outwardly. Such an injection hole 166c serves as a reserving portion for the damping member 150 upon injecting the damping material as described later.

In this embodiment, an amount of the damping material to be injected into the filling portion 166b is determined such that a small amount of the damping material is remained within the injection hole 166c.

The other constructional portions may be fundamentally the same as those of the ninth embodiment, so that its detailed explanation is omitted.

In this embodiment, as described hereinafter, after a cover 167 is secured to the opening of the filling portion 166b and a fluidizable damping material for the damping member 150 is injected into the filling portion 166b through the injection hole 166c and then the injected damping material is cured into a gel state. After curing the damping material, the cover 167 is removed from the opening of the filling portion 166b and a spring 168 is inserted into the securing hole 166a through the damping member 150, thereby performing the assembly of the apparatus. In this case, in order to insert the spring through the damping member 150, it is preferable to use a gelling damping member 150, since after curing of the damping material the spring 168 is apt to insert in the damping member 150. Further, it is preferable to make the cover 167 of Teflon (trade name) or the like. Then, the cover can easily be released from the damping member 150, If an ultraviolet curing type damping material is used, the cover 167 is preferably made of a material having high ultraviolet transmission such as glass. Then, the UV-curable damping material can be effectively exposed to the ultraviolet radiation through the cover.

As described above, this embodiment has the following advantageous effects.

The damping material is injected and cured after covering the opening of the filling portion, so that even though the opening of the filling portion is large and has no plane shape, the end plane of the damping member can be formed precisely without dispersing (refer to FIG. 43). This means that dispersion of the position and shape of the end plane of the damping member as described with reference to FIGS. 7A and 7B is not caused.

Figure 44:
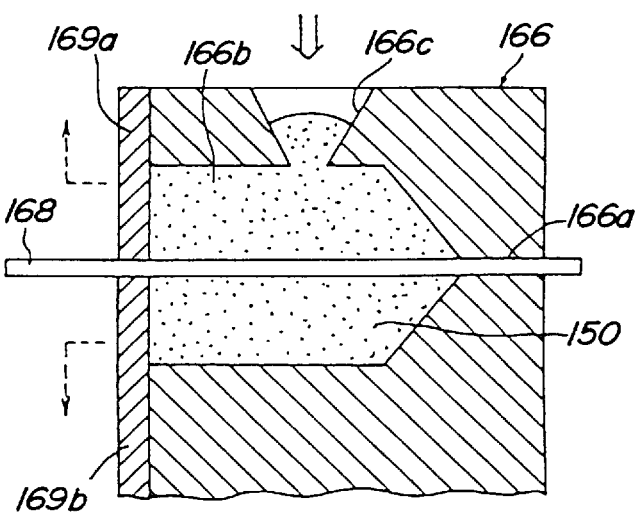
FIG. 44 is a cross sectional view illustrating a fourteenth embodiment of the optical system supporting apparatus according to the invention.

The injection hole 166c is provided with a beveled opening as a reservoir, so that a dispersion in an amount of an injected damping material can be absorbed therein. The opening of the injection hole 166c at the side of the filling portion 166b is small as shown in FIG. 44, so that even if the amount of the damping material is dispersed at the injection hole, the damping characteristic does not change.

This means that the dispersion of damping amount may be adjusted and the fluctuation of amount of damping material for effective portion of the damping member becomes decreased and that the damping adjusting portion is positioned at outside of the filling portion far from the spring as the supporting member, so that even if the damping member is dispersed at such an adjusting portion (even if the surface of the damping member is dispersed in the injection hole 166c itself), the fluctuation of the damping characteristic and the resonance frequency is small.

This embodiment does not use the spring at injection of the damping material, so that the damping material can easily be injected in the filling portion 166b.

Next a fourteenth embodiment of the present invention will be explained with reference to FIG. 44.

In the same way as described in the thirteenth embodiment, this embodiment comprises an optical system holding member, a stationary member, a supporting member for supporting the holding member having a part fixed to the stationary member and another part fixed to the holding member movably to the stationary member and a damping member provided to at least one portion of the supporting member, the damping member having the damping material which is filled in the filling portion so as to enclose the supporting member.

That is, this embodiment is a modification of the thirteenth embodiment, so that the other constructional portions may be fundamentally the same as those of the thirteenth embodiment, so that its detailed explanation is omitted.

In this embodiment, as shown in FIG. 44, two covers 169a and 169b are used. That is, after inserting the spring 168 in the stationary member 166, two covers 169a and 169b are secured to the stationary member 166 in such a manner that the spring 168 is sandwiched by the covers 169a and 169b, and then the fluidizable damping material for the damping member 150 is injected and cured. After curing, the covers 169a and 169b are removed.

According to the above assembling method, the following advantageous effects are obtained in addition to the advantageous effects described in the thirteenth embodiment.

This embodiment can be applied even when it is hard to insert the spring after curing of the damping material, for example, the damping member is in hard condition after curing the damping material, and/or even when the applied spring has uneven cross-section as shown in the ninth embodiment. It can also applied to the wire spring as shown in FIG. 44.

In this way, the cover is secured to the opening of the filling portion, and the damping material is injected and cured, and then the cover is removed, so that even if it is difficult to secure the supporting member to the damping member after curing of the damping material, due to complicated shape of the applied supporting member, it can be easily secured, and thus the end position and the shape of the damping member are not dispersed, Therefore, this embodiment can be applied to the technique shown in FIGS. 37, 38 and 39 (except for the technique for beveling), and FIGS. 40 and 41.

Now a fifteenth embodiment of the present invention will be explained with reference to FIGS. 45 and 46. In this embodiment, a leaf spring 171 and a stationary member 170 are utilized to form a filling portion for forming a damping material 150.

FIGS. 45 and 46 correspond to the construction shown in FIGS. 33 and 34, the spring 171 secures its fixed portion 171b (spring end) to a beveling surface 170a of the stationary member 170 (stationary portion). A space of for example 0.1 to 1 mm is formed between a plane wide width portion 171d and a convex portion 170b of the stationary member. The wide width portion 171d and the convex portion 170b have the same dimension in X and Y directions (FIG. 45). The damping material 150 is filled in this space.

A convex portion 170b is formed between the recess portion 170b and the beveling surface 170a of the stationary member 170. The upper surface of the convex portion 170b is lower than the beveling surface 170a and the bottom surface of the convex portion 170b is more lower than the upper surface of the convex 170b. A flexure portion 171c interconnected to the wide width portion 171d is positioned over the recess portion 170c having large space. Both side portions of the convex portion 170b of the stationary member 170 are provided with a V shaped groove 170d in X direction. The wide width portion 171d of the spring 170 is provided a hole 171e (injection hole) for injecting a fluidizable damping material for the damping material 150 at its center portion.

The other constructional portions may be fundamentally the same as those of the ninth embodiment, so that its detailed explanation is omitted.

In this embodiment, fluid damping material 150 is injected from the hole 171e of the spring 171 to insert between the wide width portion 171d and the convex portion 170b of the stationary member 170. In this case, the damping material 150 is held between the wide width portion 171d and the convex portion 170b due to surface tension, so that the damping material 150 can be filled and held between the spring 171 and the convex portion 170b.

In this case, even if an excess amount of the damping material in injected between the the wide width portion 171d and the convex portion 170b, it flows out in the X and/or Y directions of the convex portion 170b, the material flowing in the X direction flows in the V shaped groove 170d (refer to FIG. 45) or the material flowing in the Y direction flows out Y (+) side surface of the recess portion 170c and the convex portion 170b, and then the damping material 150 is cured, if necessary.

According to this embodiment, the following function and advantageous effect may be obtained.

The damping material 150 is held between the spring and the stationary portion (in this embodiment, opposite convex portion at the stationary portion side which forms a space together with the spring and injected the damping material therein), so that if the area of any one of the spring and the stationary portion is defined, the amount of the damping material contacted to the spring can be suitably adjusted as a certain amount.

In this embodiment, it is difficult to disperse the amount of the damping material. Even if an amount of the injected damping material is dispersed, the effect on the spring is small, so that stable servo characteristic can be obtained.

The damping material is held between the spring and the stationary portion due to a surface tension, the filling portion (140b) for the damping material having complicated form as in the ninth embodiment is not necessary, so that the filled potion of the damping member can easily be formed and can be downsized, and thus compact and small filling portion can be obtained.

The damping material can be injected from the hole formed in the wide width portion of the spring as an injecting portion, so that the damping material is liable to spread over the whole filling portion. Moreover, the contact area of the damping material and the spring is increased due to the opening portion, so that the damping effect becomes higher. Also, it is hard to peel off the damping material and the spring.

In this embodiment, the convex portion 170b of the stationary member 17 is limited in dimension in the X and Y directions, so that even if the wide width portion of the spring to be used is wider than the convex portion 170b, the damping material does widen only within the range limited by the area of the convex portion 170b.

Now several modifications of the fifteenth embodiment just mentioned above will be explained.

Figure 47:
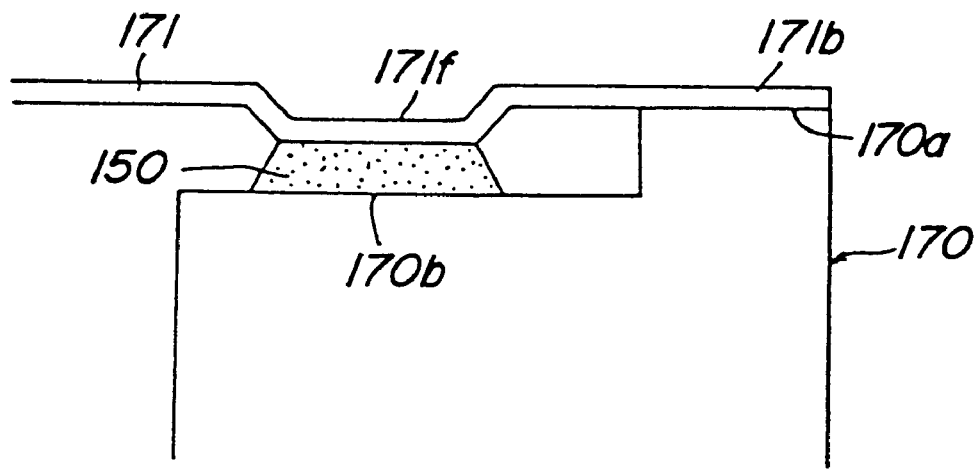
FIG. 47 is a side view showing a first modification of the fifteenth embodiment.

FIG. 47 is a side view showing a first modification of the fifteenth embodiment. In the present modification, there is formed a depressed portion 171f in a leaf spring 170 and a damping member 150 is provided between an upper surface of a projected portion 170b of a stationary member 170. Also in the present modification, the damping member 150 may be formed by injecting a fluidizable damping material into a space between the depressed portion 171f and the upper surface of the projected portion 170b. The depressed portion 171f in the leaf spring 171 may have a circular configuration viewed in the focusing direction Z.

Figure 48:
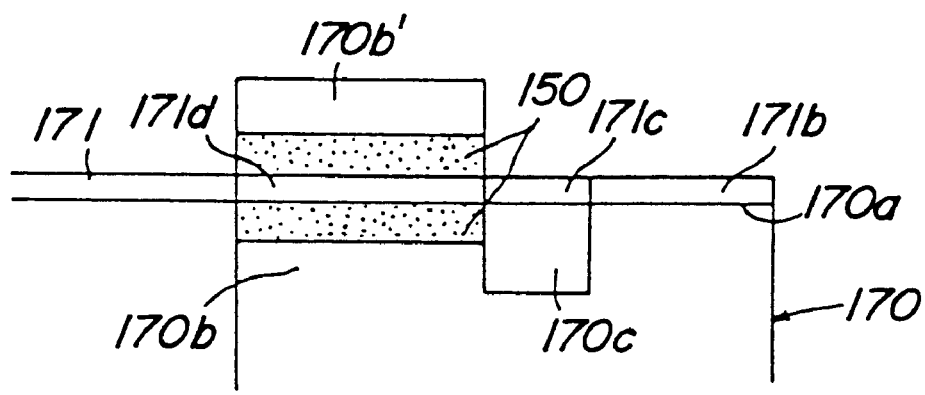
FIG. 48 is a side view depicting a second modification of the fifteenth embodiment.

FIG. 48 is a side view illustrating a second modification of the fifteenth embodiment. In this modified embodiment, an upper surface of a projected portion 170b of a stationary member 170 has formed thereon upright edges 170b' and a leaf spring 171 is inserted between the upright edges. A fluidizable damping material is injected into a apace formed by the upper surface of the projected portion 170b and inner surfaces of the upright edges 170b'. As a case may be, the injected damping material is cured to form a damping member 150.

FIG. 49 is a perspective view depicting a third modification of the fifteenth embodiment. In the present modification, a given amount of a fluidizable damping material may be injected into a space formed by a leaf spring 171 and a stationary member 170. In this case, the leaf spring 171 serves to prevent the fluidizable damping material from flowing in the direction X and the stationary member 170 serves to limit the flow of the damping material in the direction Y. A damping member 150 may be obtained by curing the fluidizable injected damping material or may be obtained by the injected fluidizable damping material.

FIGS. 50 and 51 are perspective and cross sectional views showing a fourth modification of the fifteenth embodiment. In the present modification, both sides of a widened portion 171d of a leaf spring 171 are bent downwardly to form downwardly bent portions 171d' and leaf spring 171 is secured to a stationary member 170 such that a projected portion 170b of the stationary member 170 is surrounded by the widened portion 171d of the leaf spring 171. A fluidizable damping material is injected from an opening 171e into a space formed by an upper surface and side walls of the projected portion 170b and an inner wall the widened portion 171d of the leaf spring 171. A damping member 150 may be formed by curing the thus injected fluidizable damping material.

In the present modification, a damping function can be attained for a deformation of the leaf spring 171 in the directions X and Z. Moreover, as illustrated in FIG. 52, similar advantages to those of the fifteenth embodiment shown in FIG. 46 can be attained.

FIG. 53 depicts a fifth modification of the fifteenth embodiment. In the present modification, an end portion of a leaf spring 172 is folded back such that a substantially circular widened portion 172h and a connecting portion 172g are faced with a circular widened portion 172d, a flexure portion 172c and a fixing portion 172b to form a space therebetween. The securing portion 172b is fixed onto a fixing surface 170a of a stationary member 170. In the upper widened portion 172h there is formed an opening 172e through which a fluidizable damping material is injected into said space, In this manner, it is possible to obtain a damping member 150 retained within the space formed by the lower and upper widened portions 172d and 172h as well as by the securing portion 172b and connecting portion 172g. In the present modification, the stationary member 170 can be simple in construction. Moreover, the damping member 150 is first provided in the leaf spring 172 and then the leaf spring may be secured to the stationary member 170, so that the damping member can be easily provided in the leaf spring.

FIGS. 54 and a 55 are a perspective view and a cross sectional view showing a sixteenth embodiment of the apparatus for supporting the optical system according to the invention. The construction of the present embodiment is somewhat similar to the fifteenth embodiment. In the present embodiment, a stationary member 180 comprises a fixing surface 180a, a depressed portion 180b having an upper surface which is lower than the fixing surface 180a by about 0.1–1 mm, and a projection 180c extending from the upper surface of the depressed portion 180b, an upper surface of the projection 180c being higher than the fixing surface 180a. A securing portion 181a of a leaf spring 181 is secured to the fixing surface 180a and the projection 180c of the stationary member 180 protrudes from the leaf spring through a rectangular opening 181b.

A fluidizable damping material is injected into a space formed by the stationary member 180 and the leaf spring 181. By curing the thus injected damping material, it is possible to form a damping member. In the present embodiment, the leaf spring 181 is resiliently bent in the direction Z at thinned portions 181c formed on both sides of the projection 180c. It should be noted that instead of the opening 181b, a recess may be formed in the leaf spring 181.

In the present embodiment, a damping efficiency can be improved owing to the fact that the thinned portions 181c of the leaf spring 181 is subjected to the damping function. Moreover, there are formed a number of portions subjected to the damping function by the damping member 150 at a portion at which the leaf spring crosses at right angles with the stationary member 180. The damping member 150 can be positively prevented from being removed from the leaf spring as well as the stationary member. Since the leaf spring can be obtained without a folding process, it can be manufactured inexpensively. In this connection, it should be noted that the stationary member 180 including the projection 180c can be easily manufactured by a plastic molding at a low cost.

The present invention is not limited to the embodiments explained above, but may be modified and altered in various ways within the scope of the invention. For instance, according to the invention, any kind of a fluidizable damping material may be used as long as the damping material can be injected into a small space between the leaf springs with the aid of a dispenser and can be retained within the space due to a surface tension. For instance, the damping material may be thermoset silicone resin gel, UV-cured acrylic resin gel, silicone oils such as silica powder-containing silicone oil compound and the like, grease damping material, and adhesive mainly composed of rubber such as butyl rubber, silicone rubber, chloroprene rubber and the like.

Furthermore, in the above embodiments, the optical system is composed of the objective lens, but it may comprise various optical elements such as a semiconductor laser, a hologram, a prism, a mirror and a grating in addition to or instead of the objective lens. Moreover, the springs may be formed by various materials such as plates of beryllium copper, stainless and german silver, plastic plate such as polyimid plate, metal wire having a circular cross section, and plastic mold including flexure portions.

In the first and second embodiments shown in FIGS. 11–15, the optical system holding member is supported by the leaf springs movably only in the direction Z, i.e. the focusing direction. In such a case, the tracking control may be carried out by means of a tangential mirror or galvano mirror as is well known in the art.

What is claimed is:

1. An apparatus for supporting an optical system in an optical information recording and/or reproducing apparatus comprising:

an optical system holding member for holding the optical system such that the optical system is opposed to an optical record medium;

a stationary member provided on a carriage which is movable in a given direction with respect to the optical record medium;

a supporting means for supporting said optical system holding member movably in at least one direction with respect to said stationary member and including at least two independent supporting members having a uniform length and spaced apart at a predetermined height therebetween, said two supporting members having ends offset in a radial direction with respect to the optical recording medium, and said two supporting members having first ends secured to said optical system holding member and second ends secured to said stationary member; and a damping member provided between said two supporting members, said damping member comprising a fluidizable damping material injected into a space formed between said two supporting members and retained in position between said two supporting members by surface tension.

2. An apparatus according to claim 1, wherein at least one of said two supporting members has formed therein an opening through which said fluidizable damping material has been injected into the space formed between the two supporting members.

3. An apparatus according to claim 1, wherein said damping member is formed by curing the injected fluidizable damping material.

4. An apparatus according to claim 1, wherein said two supporting members are arranged in parallel with each other with a small distance therebetween corresponding to said predetermined height.

5. An apparatus according to claim 1, wherein said surface tension is directly between and in sole contact with said two supporting members.

6. An apparatus for supporting an optical system in an optical information recording and/or reproducing apparatus comprising:

an optical system holding member for holding the optical system such that the optical system is opposed to an optical record medium;

a stationary member provided on a carriage which is movable in a given direction with respect to the optical record medium;

a supporting means including at least two independent supporting members having a uniform length and spaced apart at a predetermined height therebetween, said two supporting members having first ends and second ends offset in a radial direction with respect to the optical recording medium, and said two supporting members having said first ends connected to said optical system holding member and said second ends connected to said stationary member, said supporting means supporting said optical system holding member movably in at least one direction with respect to said stationary member; and a damping member arranged between said two supporting members, said damping member comprising a fluidizable damping material injected into a space formed between said two supporting members and retained in position between said two supporting members by surface tension, wherein said two supporting members are formed such that the amplitude and/or phase of a vibration at neighboring portions of the two supporting members are shifted.

7. A method of manufacturing an apparatus for supporting an optical system in an apparatus for recording and/or reproducing information on and/or from an optical record medium, said apparatus comprising an optical system holding member for holding the optical system such that the optical system is opposed to said optical record medium, a stationary member provided on a carriage which is movable in a given direction with respect to the optical record medium, a supporting means for supporting said optical system holding member movably in at least one direction with respect to said stationary member and including at least two independent supporting members having a uniform length and spaced apart at a predetermined height therebetween, said two supporting members having first ends and second ends offset in a radial direction with respect to the optical recording medium, and said two supporting members having said first ends secured to said optical system holding member and said second ends secured to said stationary member, and a damping member provided between said two supporting members, said method comprising the steps of:

injecting a fluidizable damping material into a space formed between said two supporting members of the supporting means; and retaining the injected fluidizable damping material in position between a main portion of said two supporting members by surface tension.

8. A method according to claim 7, wherein said method further comprises, after injecting said fluidizable damping material into said space, a curing step of curing said injected fluidizable damping material to form said damping member.

9. A method according to claim 8, wherein said curing step is performed such that said injected fluidizable damping material is transformed into a gel like damping member.

10. A method according to claim 8, wherein said curing step is performed such that said injected fluidizable damping material is transformed into a silicone rubber like damping member.

11. A method according to claim 8, wherein said fluidizable damping material is made of a thermo-setting material, and said curing step is performed by heating the damping material.

12. A method according to claim 8, wherein said fluidizable damping material is made of an UV-curable material, and said curing step is performed by irradiating the damping material with ultraviolet radiation.

13. A method according to claim 7, wherein said fluidizable damping material is injected into said space via an opening formed in one of the two supporting members.

14. A method according to claim 7, wherein said surface tension is directly between and in sole contact with said two supporting members.

* * * * *